United States Patent
Shvarzman

(10) Patent No.: US 9,624,432 B2
(45) Date of Patent: Apr. 18, 2017

(54) METHOD OF SOIL STABILIZATION USING FIBERS

(71) Applicant: ACM Technologies Inc., Winnipeg (CA)

(72) Inventor: Asia Shvarzman, Winnipeg (CA)

(*) Notice: Subject to any disclaimer, the term of this patent is extended or adjusted under 35 U.S.C. 154(b) by 0 days.

(21) Appl. No.: 14/398,142

(22) PCT Filed: Jun. 27, 2014

(86) PCT No.: PCT/CA2014/050617
§ 371 (c)(1),
(2) Date: Oct. 31, 2014

(87) PCT Pub. No.: WO2014/205581
PCT Pub. Date: Dec. 31, 2014

(65) Prior Publication Data
US 2016/0222292 A1 Aug. 4, 2016

Related U.S. Application Data

(60) Provisional application No. 61/840,734, filed on Jun. 28, 2013.

(51) Int. Cl.
| | |
|---|---|
| *E01C 23/00* | (2006.01) |
| *C09K 17/50* | (2006.01) |
| *C09K 17/40* | (2006.01) |
| *E01C 7/36* | (2006.01) |
| *C04B 28/04* | (2006.01) |
| *C04B 28/08* | (2006.01) |
| *C09K 17/08* | (2006.01) |
| *C09K 17/10* | (2006.01) |

(Continued)

(52) U.S. Cl.
CPC ............. *C09K 17/50* (2013.01); *C04B 28/04* (2013.01); *C04B 28/08* (2013.01); *C09K 17/08* (2013.01); *C09K 17/10* (2013.01); *C09K 17/40* (2013.01); *E01C 7/36* (2013.01); *E01C 23/065* (2013.01); *E02D 3/005* (2013.01); *E02D 3/02* (2013.01); *C04B 2111/00732* (2013.01); *Y02W 30/94* (2015.05); *Y02W 30/96* (2015.05); *Y02W 30/97* (2015.05)

(58) Field of Classification Search
CPC ........ C09K 17/08; C09K 17/10; C09K 17/50; E02D 3/02; E02D 3/005; E01C 7/36; E01C 23/065
USPC .............................. 404/76; 405/266; 299/1.5
See application file for complete search history.

(56) References Cited

U.S. PATENT DOCUMENTS

| | | | | |
|---|---|---|---|---|
| 4,376,598 A | * | 3/1983 | Brouns | ..................... B09B 1/00 175/16 |
| 4,689,084 A | * | 8/1987 | Ambroise | ............... C04B 28/04 106/711 |

(Continued)

*Primary Examiner* — Raymond W Addie
(74) *Attorney, Agent, or Firm* — Michael R. Williams; Ade & Company Inc.

(57) ABSTRACT

A soil stabilization mixture comprising a mixture of soil to be stabilized, fibers and binder. The soil and the fibers are mixed together. The binder, which acts as a chemical stabilizer, is then added and mixing continues. The mixture is then applied to the soil to be stabilized and the stabilized soil is then compacted. The fibers can be recycled carpet fibers, fiber reinforced polymer, biofibers or a mixture thereof. The binder includes mixtures of Portland cement and at least one of crushed glass, metakaolin and ground blast furnace slag.

15 Claims, 13 Drawing Sheets

(51) Int. Cl.
*E01C 23/06* (2006.01)
*E02D 3/00* (2006.01)
*E02D 3/02* (2006.01)
C04B 111/00 (2006.01)

(56) References Cited

U.S. PATENT DOCUMENTS

| | | | | |
|---|---|---|---|---|
| 5,145,285 | A * | 9/1992 | Fox | E02D 3/08 |
| | | | | 106/900 |
| 5,276,255 | A * | 1/1994 | Stark | B09B 1/00 |
| | | | | 405/128.45 |
| 6,042,305 | A * | 3/2000 | Novich | C09K 17/40 |
| | | | | 106/900 |
| 8,950,972 | B2 * | 2/2015 | Weaver | E01C 23/065 |
| | | | | 404/75 |
| 2007/0253773 | A1 * | 11/2007 | Huang | E01C 11/005 |
| | | | | 404/35 |
| 2013/0216307 | A1 * | 8/2013 | Weaver | E01C 23/065 |
| | | | | 404/75 |

\* cited by examiner

METHOD OF SOIL STABILIZATION USING FIBERS

The instant application claims the benefit of U.S. Provisional Patent Application 61/840,734, filed Jun. 28, 2013.

BACKGROUND OF THE INVENTION

Soil is generally a mixture of four basic types: gravel, sand, clay and silt. Soil typically has low tensile and shear strength and its specific characteristics depend on whether it is currently dry or wet.

Pavement subgrades constructed with clay soils can cause significant pavement distress because of moisture-induced volume changes, and low subgrade strength [1]. Replacement of marginal soil with higher quality materials is not always the best alternative because of cost and environmental considerations [2]. Soil stabilization is an alternative method to improve the properties of weak soils and meet the design requirements [3]. Previous research indicated that waste and by-product cementitious materials such as fly ash, and calcined clay (metakaolin for example), crushed glass, blast furnace slag are suitable alternatives to replace cement as a soil stabilizer [4-7].

SUMMARY OF THE INVENTION

According to a first aspect of the invention, there is provided a method of stabilizing a quantity of soil comprising:

mixing a quantity of soil to be stabilized with 0.5-3.0% (w/w) fibers to a substantially homogeneous mixture;

adding to said mixture 5-40% (w/w) of a binder, said binder comprising at least one of Portland cement, ground blast furnace slag, crushed glass and metakaolin;

compacting the mixture at a soil area to be stabilized.

BRIEF DESCRIPTION OF THE DRAWINGS AND TABLES

Figure 16:
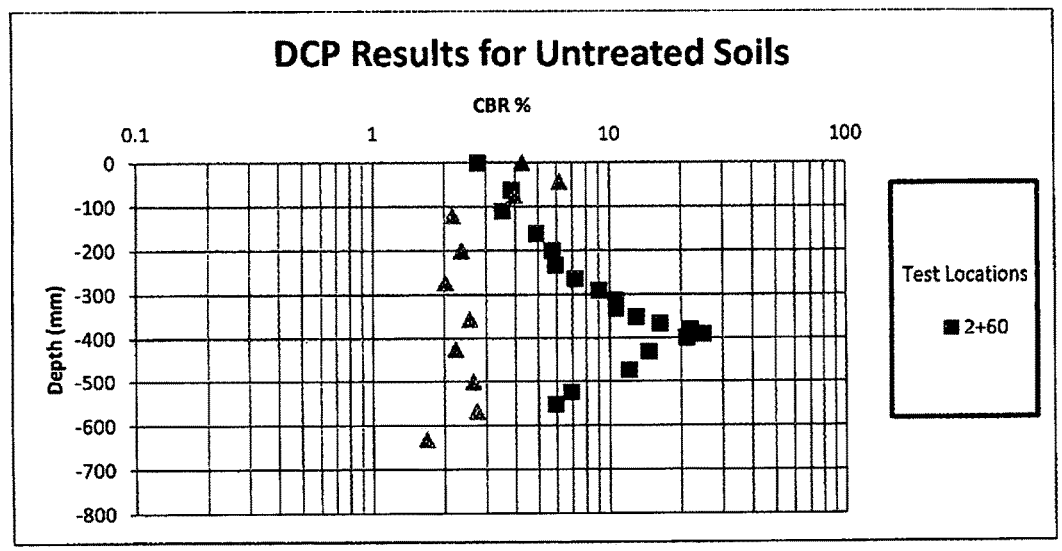

FIG. 16. DCP test Results for untreated soils.

Figure 17:
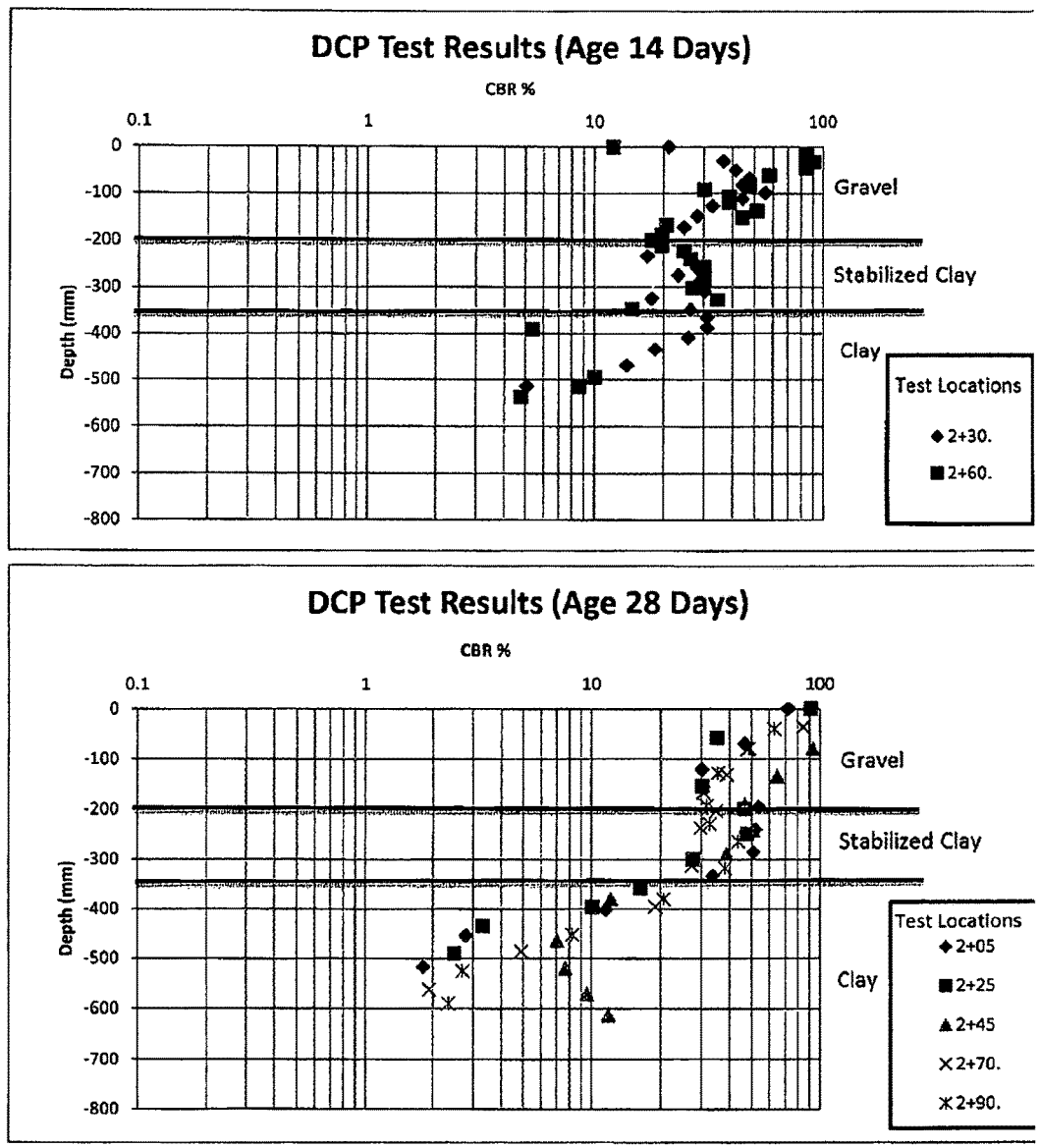

FIG. 17. DCP test Results: Effect of curing time on CBR value of treatment soils.

Figure 18:
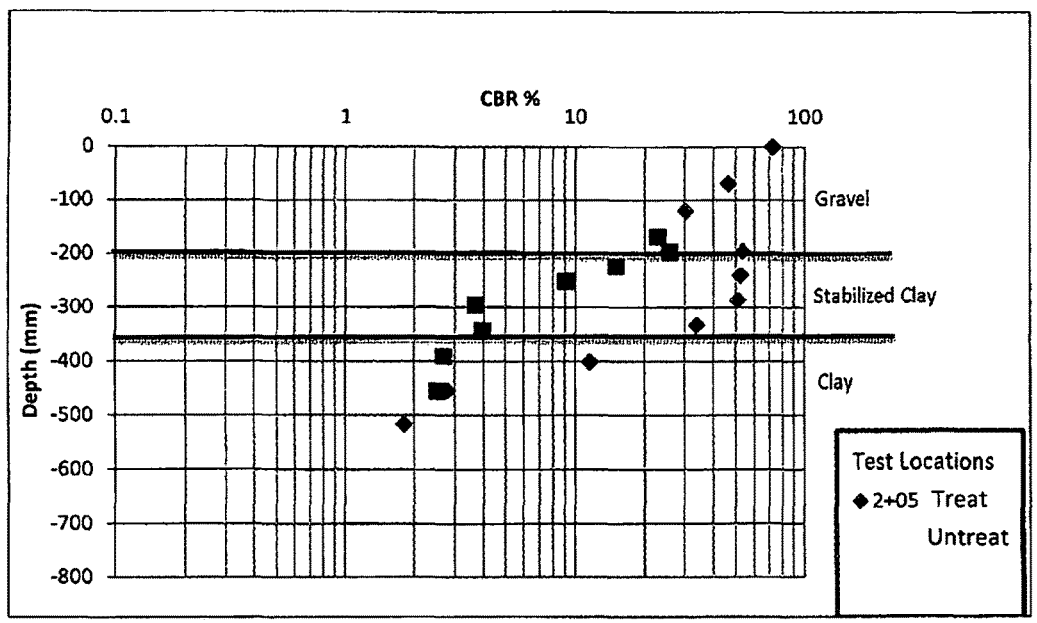

FIG. 18. DCP test results for treated and untreated soils

Figure 19:
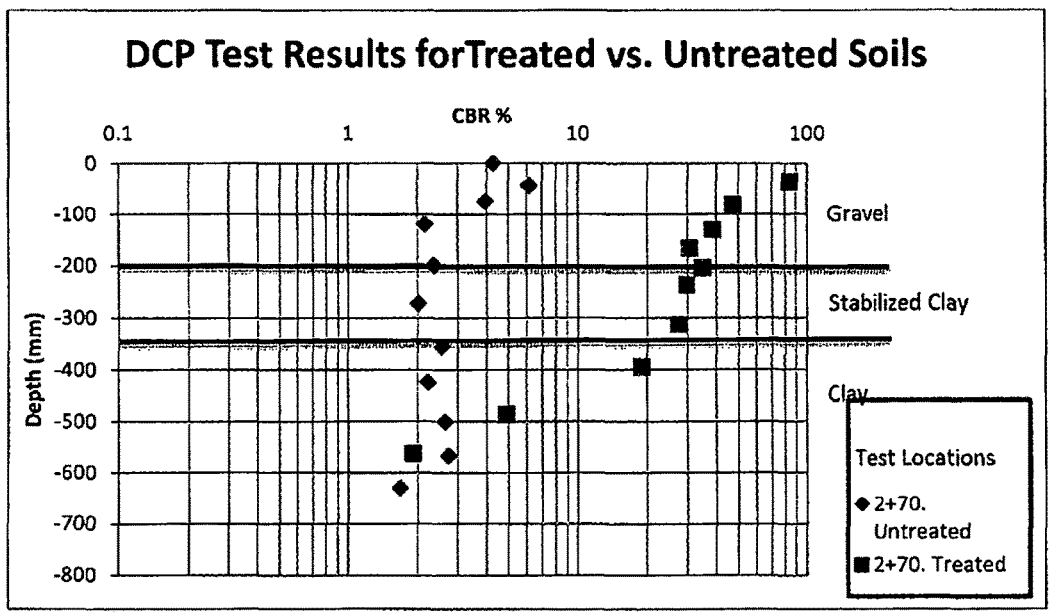

FIG. 19. DCP test results for treated and untreated soils

Figure 20:
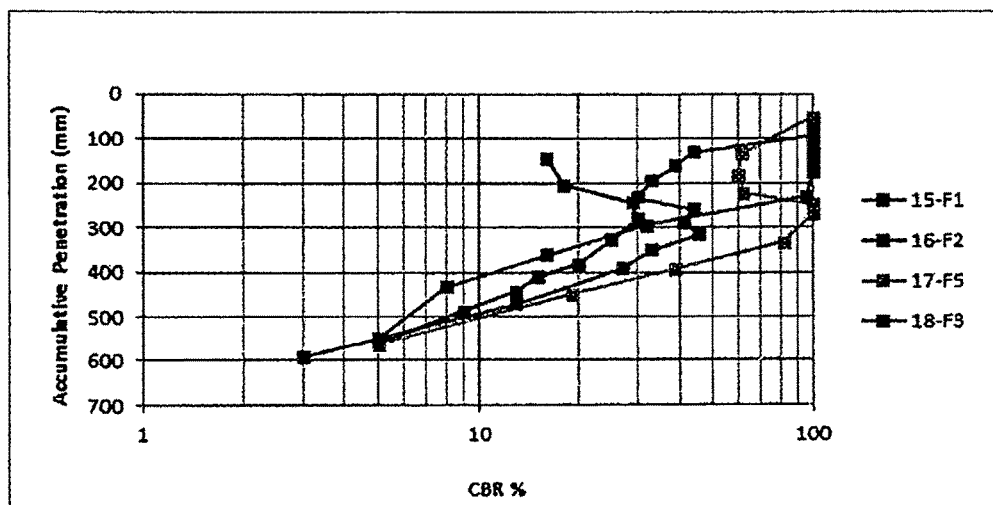

FIG. 20. DCP Test result at age 14 days: Subgrade Stabilization Area—D1

Figure 21:
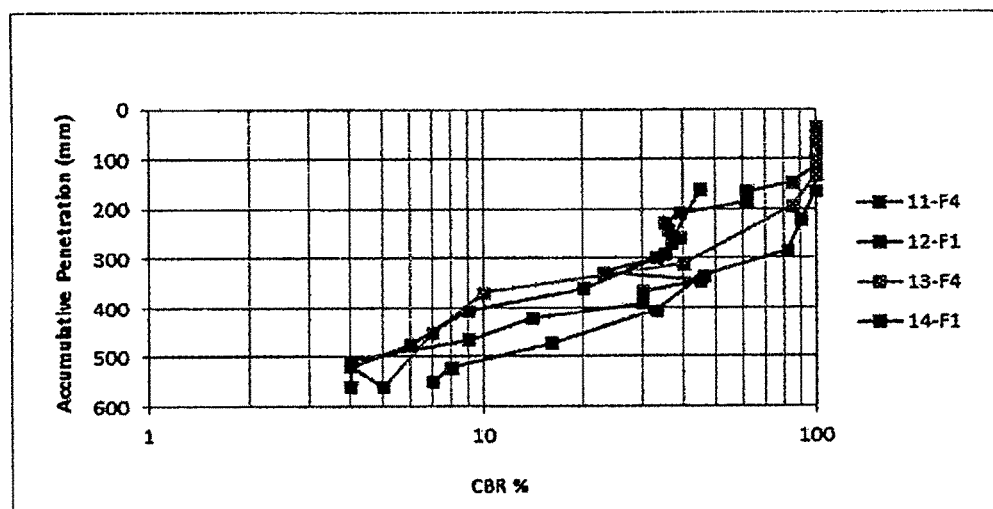

FIG. 21. DCP Test result at age 14 days: Subgrade—Subbase Stabilization Area—D2-D3

Figure 22:
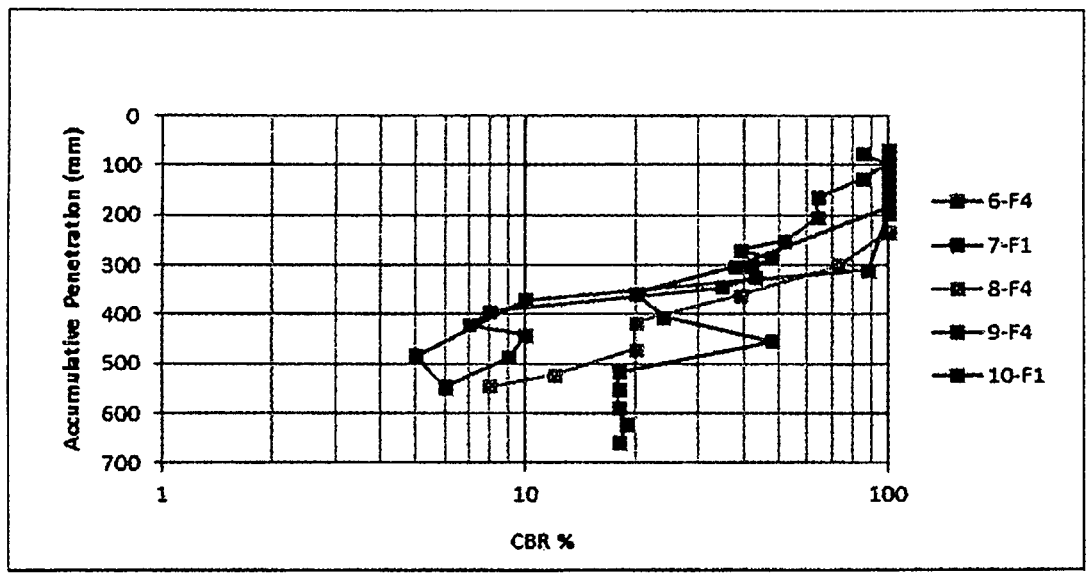

FIG. 22. DCP Test result at age 14 days: Sub base Stabilization Area—D4'.

Figure 23:
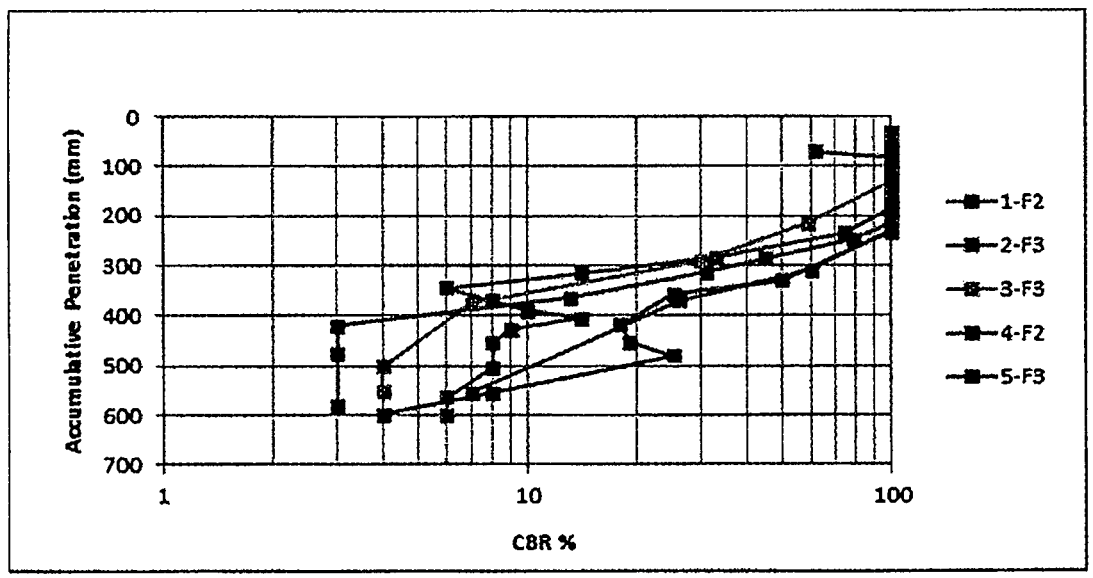

FIG. 23. DCP Test result at age 14 days: Subbase Stabilization Area—D5.

Figure 24:
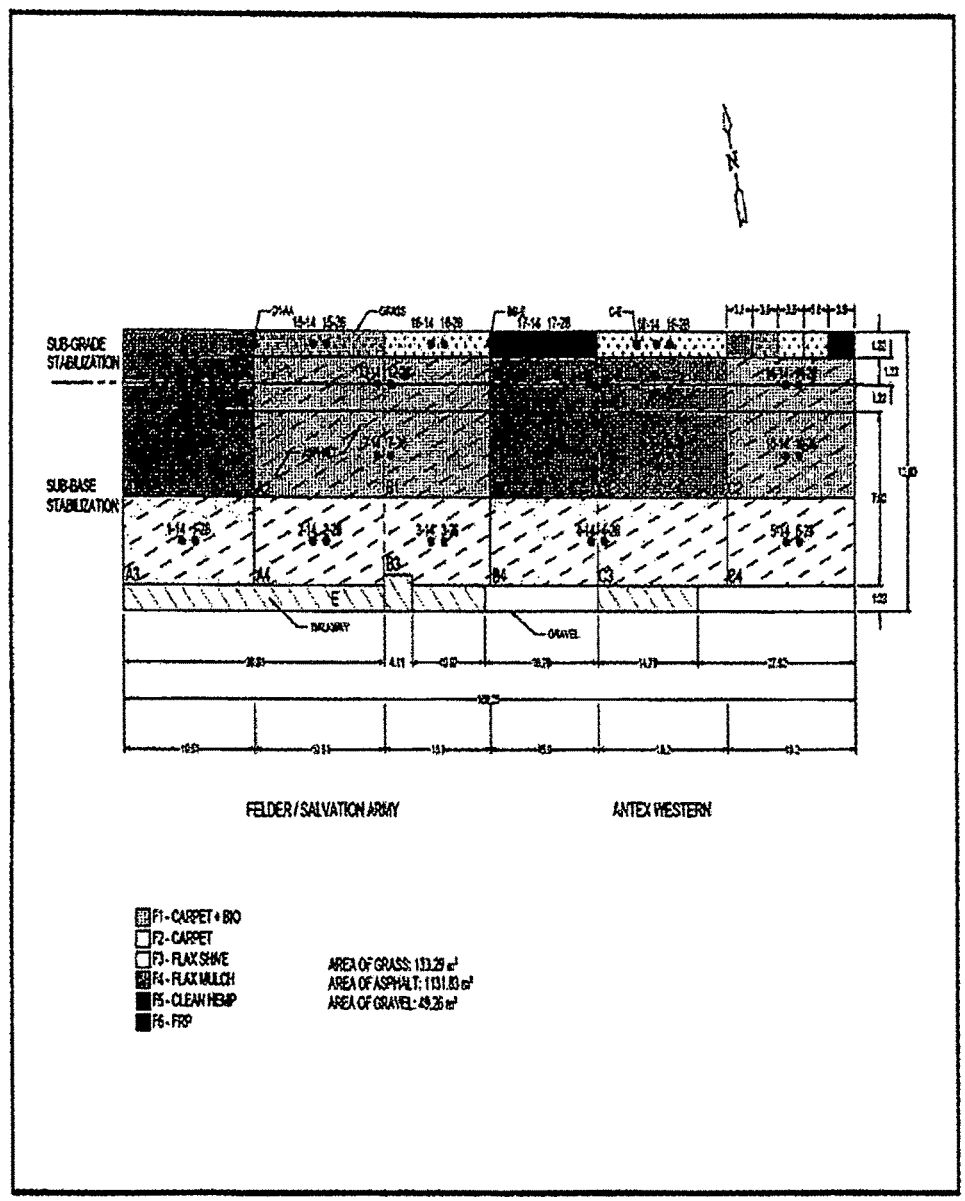

FIG. 24. Summary of Example IV.

Table 1 lists fundamental soil properties.

Table 2 lists the main components of the fertilizers.

Table 3 lists the carpet fiber and stabilizer portions used.

Table 4 lists the area under stress-strain curve (toughness).

Table 5 summaries results from for Women's Hospital and Bishop Grandin samples.

Table 6 Test results summary for treatment and untreated "BC" clay soil.

Table 7. Test results summary for treatment and untreated "LG" clay soil.

Table 8. Test results summary for treatment and untreated "DG" clay soil.

Table 9. Test results summary for treatment and untreatment "SS" silty-clay soil.

Table 10: Properties of Virgin Soil.

Table 11: Soil reinforcement materials.

Table 12: Soil Stabilizer composition for clay soils type "BC", "LG", "DG".

Table 13: Soil Stabilizer composition for clay soils type "PL".

Table 14: Soil Stabilizer composition for silt clay soils type "SS".

Table 15 Test results summary for treated subgrade clay soil (Parking Lot testing Area).

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

In pavement design, subgrade materials are typically characterized by their resistance to deformation under load and their bearing capacity or strength. In general, the more resistant to deformation, the more load a subgrade can support before reaching a critical deformation value. Expansive clay subgrades exhibit significant changes in volume in response to changes in water content. These volume changes result in severe pavement distresses such as cracking and permanent deformation or rutting. Stabilization is used to reduce the volume change potential and increase the strength or stiffness of subgrades. Similarly, marginal base layers can be stabilized to increase strength and stiffness.

Soil reinforcement or soil stabilization is generally defined as a technique to improve the engineering characteristics of soil in order to improve characteristics such as shear strength, compressibility, density, weight bearing, durability and hydraulic conductivity. The stabilized soil may be used for example in subgrade or subbase stabilization for use in the renovation or repair of a roadway, construction of a roadway, parking lot, landing strip, runway, bicycle path, walking path or the like. As will be known to those of skill in the art, strength and durability can be measured by the unconfined compressive strength test; stiffness can be measured by the laboratory resilient modulus test; bearing strength can be measured by the dynamic cone penetrometer test; durability can be measured by the freeze thaw test; and mechanical strength can be measured by the California Bearing Ratio (CBR) test.

Type of soils include but are by no means limited to: high plasticity clay, silt, silty clay, sandy clay, sandy silt, and sand. In addition, as used herein, in certain embodiments, particularly those involving full depth reclamation, "soil" includes cement, concrete, asphalt and/or base materials. As will be apparent to one of skill in the art and as discussed herein, full depth reclamation involves rebuilding worn out pavements by recycling the existing roadway by pulverizing for example the asphalt and base materials and then mixing in soil stabilization materials.

When stabilizing soil, there are a number of factors to consider, including the chemical and mineralogical composition of the soil to be stabilized, the water content of the soil to be stabilized, the physical properties of the soil to be stabilized and the intended use of the stabilized soil (design requirements).

The layers of pavement construction typically comprise a subgrade, a subbase, a base course, a paver base, pavers and fine grained sand. For example, the subgrade is the foundation of the pavement structure on which the subbase is laid.

As will be appreciated by one of skill in the art, typical soil stabilizers known in the art are made from a variety of materials: Portland Cement, Lime, Quicklime, Hydrate lime, Gypsum, Ground blast furnace slag, Fly ash Type "C", Fly Ash type F", Fly Ash type F"—Lime, Fly ash-gypsum-lime, Cement-Fly Ash, Cement-Slag, and Slag-Fly Ash.

It is known in the art to use random discrete flexible fibers to mimic the behavior of plant roots and thereby contribute to the stability of soil mass by adding strength to the near-surface soils. However, tangling of fibers can make it difficult to obtain a homogeneous soil:fiber mixture.

Described herein is a novel soil stabilization mixture comprising a mixture of soil to be stabilized, fibers and binder. Herein, "binder" and "stabilizer" are used interchangeably.

As discussed herein, the soil and the fibers are mixed together. The binder, which acts as a chemical stabilizer, is then added and mixing continues. Depending on the water content of the soil, more water may be added. The mixture is then compacted with the soil to be stabilized.

Thus, in some embodiments, the soil is removed from the soil site to be stabilized and is mixed with the fibers and stabilizers. The mixture is then returned or applied to the soil site and compacted, thereby stabilizing the soil.

In other embodiments, the soil is not removed but is mixed with the fibers and stabilizer at the site. As will be appreciated by one of skill in the art, this requires the estimation of the volume and/or weight of the soil that is being mixed so that the appropriate amounts of fibers and stabilizer can be added, as discussed herein. In these embodiments, the mixture is already at the desired soil site and needs only to be compressed.

In yet other embodiments, for example, in embodiments relating to full depth reclamation or similar processes, the existing asphalt or cement at the site to be stabilized is pulverized. As discussed herein, for the purposes of the invention, the pulverized asphalt or cement is considered to be equivalent to soil and the appropriate amount of fibers and stabilizers for the estimated volume or weight of the pulverized asphalt or cement (soil) is added and mixed together. The mixture is then compacted and new asphalt may be applied, as discussed herein.

In preferred embodiments, the fibers are recycled carpet fibers, fiber reinforced polymer, biofibers or a mixture thereof. The biofibers may be any suitable biofiber. The biofiber may be selected from any known suitable biofiber, for example but by no means limited to hemp, flax, straw and the like. In preferred embodiments, the biofibers are selected from the group consisting of flax shive, flax mulch and hemp. It is of note that the biofiber acts as a reinforcement element or reinforcing element but also acts as an absorbent. It is further of note that the biofiber s may be biodegradable.

The fibers may be of a size between 1-40 mm. For example, recycled carpet fibers may be 5-30 mm, flax shive may be 20-30 mm, flax mulch may be 1-20 mm, hemp may be 1-15 mm and the fiber reinforced plastic may be 10-40 mm. This is shown in Table 11.

As discussed herein, "recycled carpet fibers" refers to waste carpet and/or carpet remnants. As will be appreciated by one of skill in the art, "carpet" is typically a complex, multi-component system comprising for example polypropylene, nylon and polyester fiber. A carpet typically consists of two layers of backing (usually fabrics from polypropylene tape yarns), joined by a $CaCO_3$ filled styrene-butadiene latex rubber (SBR), and face fibers (generally nylon 6 and nylon 66 textured yarns) tufted into the primary backing.

As will be appreciated by one of skill in the art, the length and thickness of the recycled carpet fibers is very important. Specifically, short fibers, for example, 5-30 mm, are more easily mixed with the soil.

In general, fiber characteristics such as for example aspect ratio, skin friction, modulus of elasticity, have significant effects on the mechanical properties of reinforced soils, as discussed herein. Specifically, the strength of fiber reinforcement in the stabilized soil increases with increasing aspect ratio, fiber modulus and soil fiber surface friction. As discussed herein, certain fibers will absorb moisture. In addition, the fibers improve the toughness of the reinforced soils and prevent cracking, for example, during freeze/thaw cycles, as discussed below.

As discussed herein, the fibers may be added to the soil to be stabilized at 0.5 to 3.0% of the dry weight of the soil. In alternative embodiments, the fibers may be added at 0.75% to 3.0% or 0.5% to 2.5% or 0.5% to 2.25% or 0.75% to 2.5% or 0.75 to 2.25% of the dry weight of the soil. In some cases, as discussed above, the dry weight of the soil may be estimated.

The binder comprises at least one of Portland cement, ground blast furnace slag, crushed glass, metakaolin and mixtures thereof. Preferably, the binder is added to the soil at 5-40% of the dry soil weight, for example at 5-30%, at 10-40%, at 12-40%, at 12-30%, at 5-25%, at 10-25% or at 12-25% of the dry soil weight.

In some embodiments, the binder comprises 0-100% Portland cement, 0-100% ground blast furnace slag, 0-100% crushed glass, 0-50% metakaolin and mixtures thereof. That is, as discussed below, the binder or stabilizer will comprise at least one and in some cases two or more of the examples listed above.

In other embodiments, the stabilizer or binder comprises a mixture of two or more of 8-85% Portland cement, 0-50% crushed glass, 0-15% metakaolin and 0-85% ground blast furnace slag.

In yet other embodiments, the stabilizer or binder comprises a mixture of two or more of 15-85% Portland cement, 0-50% crushed glass, 0-15% metakaolin and 0-85% ground blast furnace slag.

In yet other embodiments, the stabilizer or binder comprises a mixture of two or more of 40-85% Portland cement, 0-50% crushed glass, 0-15% metakaolin and 0-85% ground blast furnace slag.

In yet other embodiments, the stabilizer or binder comprises a mixture of 15-85% Portland cement and at least one of 0-50% crushed glass, 0-15% metakaolin and 0-85% ground blast furnace slag.

In yet other embodiments, the stabilizer or binder comprises a mixture of 40-85% Portland cement and at least one of 0-50% crushed glass, 0-15% metakaolin and 0-85% ground blast furnace slag.

In yet other embodiments, the stabilizer is selected from the group consisting of: 85% Portland cement and 15% metakaolin (AS1); 8% Portland cement, 50% crushed glass, 2% metakaolin and 40% ground blast furnace slag (AS4); 40% Portland cement, 50% crushed glass, 2% metakaolin and 8% ground blast furnace slag (AS5); 68% Portland cement, 10% ground glass, 12% metakaolin and 10% ground blast furnace slag (AS7); 60% Portland cement, 10% ground glass, 15% metakaolin and 15% ground blast furnace slag (AS8); 60% Portland cement, 15% ground glass, 15% metakaolin and 10% ground blast furnace slag (AS10); 50% Portland cement, 25% ground glass; 7.5% metakaolin and 17.5% ground blast furnace slag (AS11); 70% Portland cement, 15% metakaolin and 15% ground blast furnace slag (AS20); 70% Portland cement, 15% ground glass and 15% metakaolin (AS21); 85% Portland cement and 15% ground blast furnace slag (AS22); 15% Portland cement and 85% ground blast furnace slag (AS23); 50% Portland cement and 50% ground blast furnace slag (AS24); 50% Portland cement, 5% metakaolin and 45% ground blast furnace slag (AS25); and 50% Portland cement, 10% metakaolin and 40% ground blast furnace slag (AS26). As will be appreciated by one of skill in the art, other suitable combinations at different percentages of the various components may be used within the invention.

Portland cement is the most common type of cement in general use around the world. It is a hydraulic cement produced by pulverizing clinkers consisting essentially of hydraulic calcium silicates, usually containing one or more of the forms of calcium sulfate as an inter ground addition.

Ground blast-furnace slag is obtained by quenching molten iron slag (a by-product of iron and steel-making) from a blast furnace in water or steam, to produce a glassy, granular product that is then dried and ground into a fine powder.

Metakaolin is a dehydroxylated form of the clay mineral kaolinite. Specifically, metakaolin is an amorphous alumosilicate material.

The crushed glass is preferably finely crushed such that the average particle size is less than 75 microns.

As discussed herein, the crushed glass acts as microfilter and also as a pozzolanic material when present in the binder. Specifically, pozzolanic material contains silicic acid which takes part in a chemical reaction with components of the Portland cement, specifically, calcium hydroxide (or Portlandite) to form a calcium silicate hydrate.

As discussed herein, the composition of the binder is dependent on the soil to be stabilized. Specifically, the chemical and mineralogical composition of the soil, the physical and mechanical properties of the soil and the design requirements (intended use of the stabilized soil) all must be considered when determining what binder or stabilizer composition is to be utilized. As discussed in the examples, different combinations have different effects on certain types of soil and must be selected accordingly. That is, the weakness of the virgin or untreated soil and the desired properties of the stabilized soils must be considered when selecting a binder. However, as demonstrated by the examples, a suitable binder mixture can easily be confirmed through routine experimentation. Thus, selection of the binder depends not only on the soil properties but also on the site condition. Similarly, the concentration of the binder used will also have an effect on the outcome.

Furthermore, it is important to note that the instant invention provides utility for material that otherwise would remain in a landfill. It is also of note that the carpet fibers will not biodegrade as quickly as biofibers, indicating that not only is this material in effect being recycled, the inventor has discovered a way in which to produce stabilized soil from cheaper materials through the use of the disclosed soil stabilization stabilizers and fibers.

As will be appreciated by one of skill in the art, different combinations of binder or stabilizer and fibers can have different effects in different soil types, as demonstrated below. For example, For example AS7, which consisted of 68% Portland cement, 10% crushed glass, 12% metakaolin and 10% ground blast furnace slag, was a very effective stabilizer for "BC" clay soil. Similarly, stabilizer AS20, which consisted of 70% Portland cement, 15% metakaolin and 15% ground blast furnace slag, was very effective for low water content silt clay soils. For high water content silt soil, the stabilizers AS25, which consisted of 50% Portland cement, 5% metakaolin and 45% ground blast furnace slag, and AS26, which consisted of 50% Portland cement, 10% metakaolin and 40% ground blast furnace slag, were very effective. Other suitable stabilizer and soil type combinations will be readily apparent to one of skill in the art in view of the disclosure of the invention herein and the examples provided below.

For example, as discussed below, soils stabilized with the binder and fibers of the invention showed a significant decrease in maximum volume change compared to virgin soil when undergoing freeze-thaw conditions. Specifically, pavement can swell and/or lose volume as a result of changes in moisture content and freezing or drying. This in turn means that such stabilized soils will undergo less heaving in cold climates. As will be appreciated by one of skill in the art, a cold climate may be considered to be any region that undergoes more than one or more than two freeze thaw cycles during a winter season.

As discussed below, stabilized Women's Hospital soils showed up to 50% decrease in loss soil mass at the end of 12 freeze-thaw cycles in comparison with virgin soil. Due to high moisture content, virgin soil (40%) from Bishop Grandin collapsed after 3 cycles.

Furthermore, the stabilized samples showed increased strength and toughness compared to untreated soil samples, as discussed below.

According to an aspect of the invention, there is provided a method of stabilizing a quantity of soil comprising:

mixing a quantity of sod with 0.5-3.0% (w/w) fibers to a substantially homogeneous mixture;

adding to said mixture 5-40% (w/w) of a binder, said binder comprising at least one of Portland cement, ground blast furnace slag, crushed glass and metakaolin;

compacting the mixture with a soil area to be stabilized.

According to another aspect of the invention, there is provided a method of stabilizing a quantity of soil comprising:

removing a quantity of soil from a soil area to be stabilized;

mixing the soil with 0.5-3.0% (w/w) fibers to a substantially homogeneous mixture;

adding to said mixture 5-40% (w/w) of a binder, said binder comprising at least one of Portland cement, ground blast furnace slag, crushed glass and metakaolin;

applying said mixture to the soil area to be stabilized; and compacting the mixture and the soil area to be stabilized.

According to an aspect of the invention, there is provided a method of carrying out a full depth reclamation procedure comprising:

pulverizing a quantity of asphalt, concrete or cement;

mixing the pulverized asphalt, concrete or cement with 0.5-3.0% (w/w) fibers to a substantially homogeneous mixture;

adding to said mixture 5-40% (w/w) of a binder, said binder comprising at least one of Portland cement, ground blast furnace slag, crushed glass and metakaolin; and compacting the mixture.

The soil being stabilized may be used as a subgrade or sub base or may be subgrade or sub base for a construction project, as discussed herein, or for full depth reclamation, as discussed herein.

New asphalt may then be applied onto the compacted mixture, as discussed herein.

In any of the methods described above, the fibers may be added at 0.75% to 3.0% or 0.5% to 2.5% or 0.5% to 2.25% or 0.75% to 2.5% or 0.75 to 2.25% of the dry weight of the soil. In some cases, as discussed above, the dry weight of the soil may be estimated.

The binder comprises at least one of Portland cement, ground blast furnace slag, crushed glass, metakaolin and mixtures thereof. Preferably, the binder is added to the soil at 5-40% of the dry soil weight, for example at 5-30%, at 10-40%, at 12-40%, at 12-30%, at 5-25%, at 10-25% or at 12-25% of the dry soil weight.

In other embodiments, the stabilizer or binder comprises a mixture of two or more of 8-85% Portland cement, 0-50% crushed glass, 0-15% metakaolin and 0-85% ground blast furnace slag.

In yet other embodiments, the stabilizer or binder comprises a mixture of two or more of 50-85% Portland cement, 0-50% crushed glass, 0-15% metakaolin and 0-50% ground blast furnace slag.

In yet other embodiments, the stabilizer or binder comprises a mixture of 50-85% Portland cement and at least one of 0-50% crushed glass, 0-15% metakaolin and 0-50% ground blast furnace slag.

In any of the above methods, the fibers may be recycled carpet fibers, fiber reinforced polymer, biofibers or a mixture thereof. The biofiber may be selected from any known suitable biofiber, for example but by no means limited to hemp, flax, straw and the like. In preferred embodiments, the biofibers are selected from the group consisting of flax shive, flax mulch and hemp. It is of note that the biofiber acts as a reinforcement element or reinforcing element but also acts as an absorbent. It is further of note that the biofibers may be biodegradable.

In some embodiments, mixtures of fibers may be used. As will be apparent to one of skill in the art, mixtures of biofibers may be used, or biofibers or mixtures thereof may be mixed with recycled carpet fibers or fiber reinforced polymer. For example, recycled carpet fiber may be mixed with flax shive fiber, for example, 1.5% carpet fiber and 0.5% flax shive fiber.

The fibers may be of a size or length of between 1-40 mm. For example, recycled carpet fibers may be 5-30 mm, flax shive may be 20-30 mm, flax mulch may be 1-20 mm, hemp may be 1-15 mm and the fiber reinforced plastic may be 10-40 mm.

According to another aspect of the invention, there is provided a method of selecting a suitable binder composition for stabilizing a specific soil region comprising: mixing a quantity of soil with 0.5-3.0% (w/w) fibers to a substantially homogeneous mixture; separating the mixture into a plurality of samples and adding to each sample 5-40% (w/w) of a respective binder, thereby producing a plurality of stabilized soil samples, each said respective binder comprising a mixture of at least two of Portland cement, ground blast furnace slag, crushed glass and metakaolin; testing the strength and toughness of each one of the plurality of stabilized soil samples; and selecting the respective binder from the stabilized soil sample that has the desired strength and toughness characteristics for the desired application or intended use.

As will be apparent to one of skill in the art, the Portland cement is replaced with alternative cementitious materials, specifically, metakaolin, crushed glass and ground blast-furnace slag. As will be appreciated by one of skill in the art, these alternative cementitious materials have other beneficial properties.

As demonstrated below, virgin soils and chemically treated soils without fibers exhibit brittle stress-strain curves and have relatively low toughness which may cause the virgin soil to crack. However, the fibers provide reinforcement, as demonstrated by increase in toughness and strength. Strength improvement extends the pavement service life.

As discussed above, the stabilized soil can be used on subgrade clay and silt clay soils and sub base stabilization for new road construction and road renovation.

As discussed in the examples, the subgrade clay soil stabilized by the method of the invention has a 9-10 times higher CBR value compared to that of virgin soil. In fact, the CBR value of treated subgrade soil was equal to that of traditional base materials such as lime stone.

As demonstrated below, the methods of the invention can successfully be used in a full depth reclamation process as an alternative for excavation and replacement of new base materials.

As discussed herein, the results show that for the same inputs and asphalt thickness, the stabilized subgrade resulted in a 29% reduction in base thickness compared to the non-stabilized subgrade.

As discussed herein, the binders of the invention significantly increased compressive strength of clay and silt clay soils. Furthermore, the toughness value of these soils significantly increased when stabilizers were used. Stabilized soils also demonstrated higher stability during freeze-thaw testing and demonstrated higher cracking resistance. Stabilizer AS7 and fibers (mixture of recycled carpet fibers and biofiber) demonstrated the best stabilization of high clay plasticity soils in terms of engineering properties, required application method and cost. For silt clay soils with high water content the Stabilizer AS25 or AS26 demonstrated the best properties.

As demonstrated herein, biofibers (flax, hemp), recycled fibers (carpet, FRP) and carpet fiber-bio-fiber mix can be used as soil fiber reinforcement materials. The type of fiber, fiber concentration and fiber surface roughness have an effect on the mechanical properties, crack potential and durability of treated soils, as discussed herein. For example, the fracture energy and crack resistance for stabilized soils increased significantly with increasing fibers content. While fiber reinforcement improves the compressive strength of stabilized soils, at a certain point, further addition of fibers decreases the unconfined compressive strength of stabilized soils, as discussed herein. Furthermore, higher concentrations of fibers (over concentration) have a negative effect on workability of the soil and the overall mixing process, as discussed below. Furthermore, biofibers have a negative effect on the freeze thaw behavior of virgin reinforcement soils (soil mixed with fibers but no binder); however, when used with stabilized soils, there is no significant effect.

As demonstrated below, increasing the percentage of stabilizer added to the soil and allowing for longer curing time substantially increases the unconfined compressive strength of clay and silt clay soils. As will be well known by one of skill in the art, curing of concrete in some instances is defined as the maintenance of adequate moisture and temperature conditions to allow the development of required physical properties. Curing can consist of both initial and final measures. Initial curing measures may include fogging and evaporation retarders where critical drying is likely, and final curing measures may typically include white pigmented curing compounds, The invention will now be further described by way of examples. However, the invention is not necessarily limited to the examples.

Two locations were selected for clayey soil. Specifically, clay subgrade soils were sampled from Women's Hospital, Health Science Centre (HSC) and Bishop Grandin Street in Winnipeg. Table 1 shows the properties of both soils. All stabilizers were applied to both Women's Hospital and Bishop Grandin clayey soils. As can be seen from Table 1, the Bishop Grandin soil represents weaker soil. Three types of stabilizer, AS1, AS7, and AS8 (respectively, discussed above), were used at 12, 25, and 18% of dry soil weight respectively. Table 2 presents the main components of the different stabilizers. Shredded post-consumer (recycled) carpet fibers were applied at a rate of 1.5% total weight as reinforcement. The same amount of carpet fiber and stabilizer were used in both locations. Table 3 shows the amount of stabilizer (binder) and fiber, in this case, carpet fiber.

Soil samples were oven dried. Recycled carpet fiber at a rate of 1.5% was added and mixed with the dry soil. Optimum water content of Women's Hospital soil was determined to be 29%, and water was mixed with dry soil and fibers. The mixture was manually mixed and left overnight in a sealed plastic bag to equilibrate moisture through the mixture. 2% additional water was mixed with each stabilizer (binder) before mixing with the soil to enhance the process of hydration of the cementitious materials. Moisture content of Bishop Grandin soil was selected to be 40% to match the field moisture content. According to ASTM D SS8-03, mixtures were left for maximum 10 minutes before compacting in the mold to enhance moisture absorption by the stabilizers. Based on ASTM DSSS, a cylindrical metal mold with an internal diameter of 101.6 mm (4 in.) was used to prepare compacted soil samples for freezing and thawing conditioning and unconfined compression test. Stabilized soil was placed in a mold in three equal layers. Each layer was compacted by 25 blows with a rammer dropping from a height of 304.8 mm (12 in.). The compacted stabilized samples were kept in sealed plastic bags compression for 7 days before testing to allow for hydration.

Unconfined test was applied on all stabilized and virgin samples. According to ASTM D 1633-00 (2007) compression testing machine with a moving head operating at 0.05 in. (1 mm)/min was used for this test. Two different water contents, 29% and 25%, were prepared for Women's Hospital virgin soil to compare unconfined compression strength at the approximate moisture content of stabilized soil specimens.

Freeze and Thaw Conditioning

Freeze-thaw conditioning is an important test for subgrades particularly in cold regions where frost heave is a common problem. Frost heave in the subgrade can cause severe distress such as rutting in pavement surfaces. Freezing of soil material followed by thawing is considered to be a freeze-thaw cycle. The freeze-thaw test was run to simulate the effect of frost heave on pavement subgrades. Women's Hospital specimens were conditioned for 12 cycles and Bishop Grandin samples were conditioned for 6 cycles of freezing-thawing. Each cycle consists of placing samples in a freezing chamber at −23° C. (−10° F.) for 24 hours, followed by placing the samples in a moisture room at 21° C. (70° F.) and 100% humidity for 23 hours. After completing all cycles, soil-loss and volume change were calculated according to ASTM D560-03.

Unconfined Compression Test after Freeze and Thaw Conditioning

The unconfined compression test was run for Women's Hospital specimens to determine soil strength after freeze/thaw conditioning based on the Alberta Department of Transportation freezing-thawing test. Samples from Bishop Grandin were not tested due to the high moisture content and low stability after conditioning.

Figure 1:
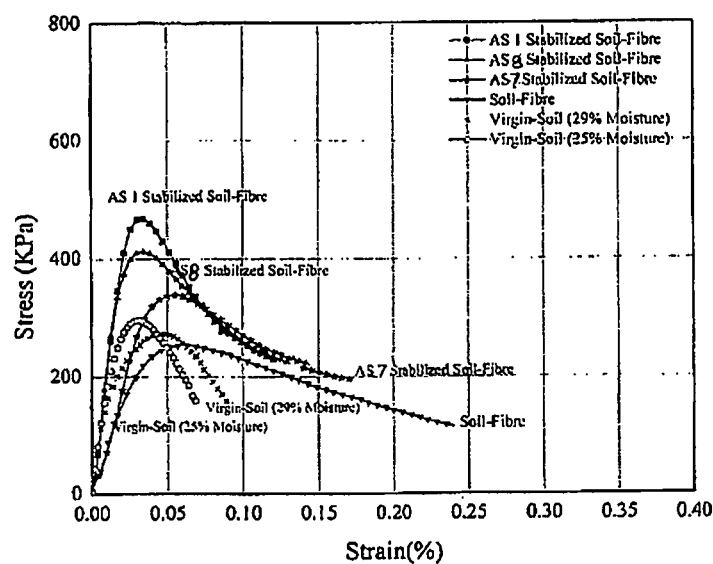
FIG. 1 is a graph of the stress-strain relationship in unconfined compressive strength (clay soil Type A).
Figure 2:
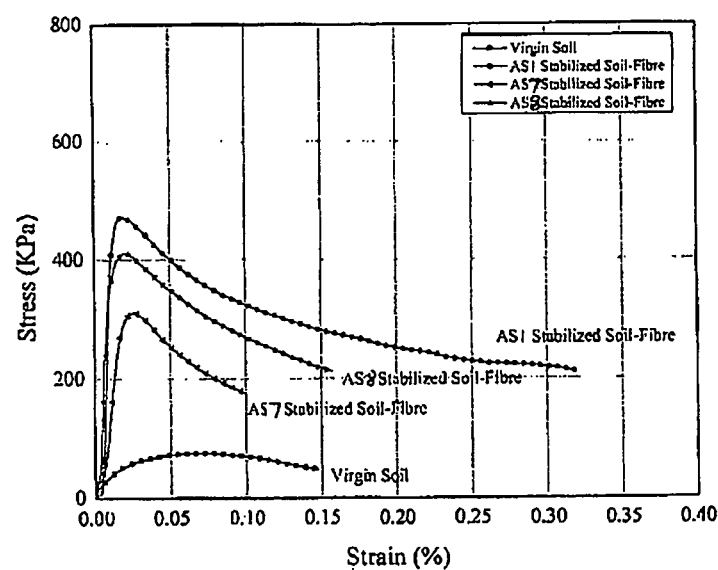
FIG. 2 is a graph of the stress-strain relationship in unconfirmed compressive strength (clay soil Type B).

As can be seen from FIGS. 1 and 2, all stabilized soil samples demonstrated higher strength compared to virgin soil. However, the combination of soil and fiber alone (no binder) did not show any improvement in strength compared to the virgin soil. However, the fibers do provide reinforcement, as demonstrated by increase in toughness.

Specifically, AS1 stabilized soil-fiber showed the greatest soil strength. This is not surprising as AS1 contains the highest level (85%) of Portland cement. However, AS7 contains more Portland cement than AS8 (68% versus 60%) but AS8 imparted greater strength to the soil samples, indicating that for these types of soil, metakaolin and ground blast-furnace slag can more than effectively substitute for Portland cement.

Specifically, AS1, AS7, and AS8 demonstrated 72%, 24%, and 51% increase in strength for the Women's Hospital soil samples and 527%, 312%, and 445% improvement in the Bishop Grandin soil stabilized specimens compared to virgin soil with optimum moisture content. Specifically, increasing water content had a negative effect on soil strength. Furthermore, the Bishop Grandin soil was very weak and accordingly was strengthened by a considerable degree by the mixture and process of the invention, as demonstrated herein.

Unconfined compression tests were stopped for all the samples when specimen load reached the peak and dropped to 60% of the peak load.

Table 4 shows how toughness improved when stabilizers were used. Generally, toughness is referred to as the area below stress-strain curve, indicating the amount of strain energy that causes deformation in specimen [8].

As will be known to one of skill in the art, toughness is the amount of energy a material can absorb. Fibers are known for increasing toughness. Virgin soils and chemically treated soils without fibers exhibit brittle stress-strain curves and have relatively low toughness which may cause the virgin soil to crack.

As can be seen, AS1 (38.43), AS7 (37.61) and AS8 (42.12) all increased toughness of the Women's Hospital soil samples to approximately the same degree, with AS8 showing the greatest effect compared to the virgin soil (19.62). Furthermore, the Bishop Grandin soil had a much lower toughness (9.17) than the Women's Hospital soil (19.62) but AS1 increased that toughness significantly (92.43) while AS8 (45.87) and AS7 (21.97) also increased the soil toughness.

During the freezing/thaw treatment, size and weight of samples were measured at the end of each cycle. It should be noted that after the second cycle, cracking was observed on the sides of the virgin soil samples for both Women's Hospital and Bishop Grandin samples. Similar cracks started to occur on stabilized specimens only after the fourth cycle. The Bishop Grandin virgin soil sample fell apart during the third freeze/thaw treatment due to the high moisture content and very low stability of the soil. Therefore, it was decided to condition all the Bishop Grandin samples only for 6 cycles.

Figure 3:
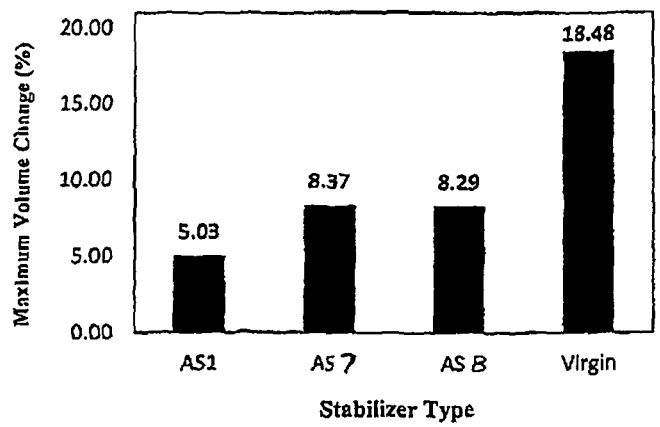
FIG. 3 is a bar graph showing the maximum volume change during 12 cycles of conditioning (clay soil Type A).
Figure 4:
FIG. 4 is a bar graph showing the maximum volume change during 6 cycles of conditioning (clay soil Type B).

FIGS. 3 and 4 summarize the maximum volume change after freezing and thawing for Women's Hospital and Bishop Grandin soil samples, respectively. Women's Hospital samples exhibit higher stiffness. The maximum volume change decreased 72.8%, 54.7%, and 55.2% when compared to virgin soil for AS1, AS7, and AS8, respectively. The maximum volume change for Bishop Grandin samples decreased by 52%, 13%, and 27% compared to virgin soil when AS1, AS7, and AS8 were used, respectively. This reduction points out that stabilized soil exhibits higher stiffness compared to virgin soil. It can be concluded that stabilized soils are less susceptible to volume change resulting in greater cracking and frost heave resistance.

Figure 5:
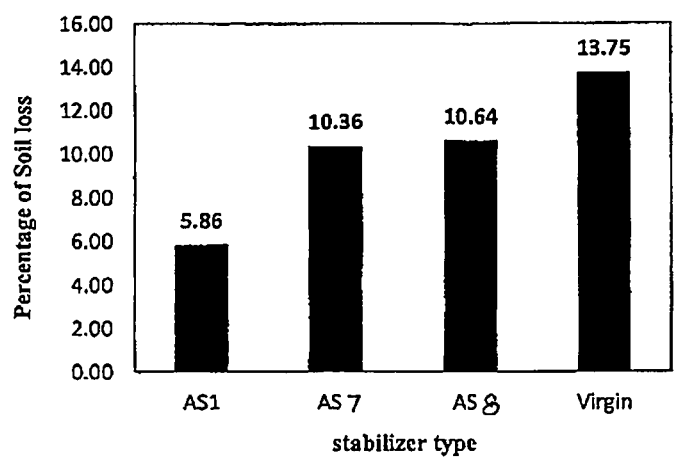
FIG. 5 is a bar graph showing the percentage of soil loss after 12 cycles (clay soil Type A).
Figure 6:
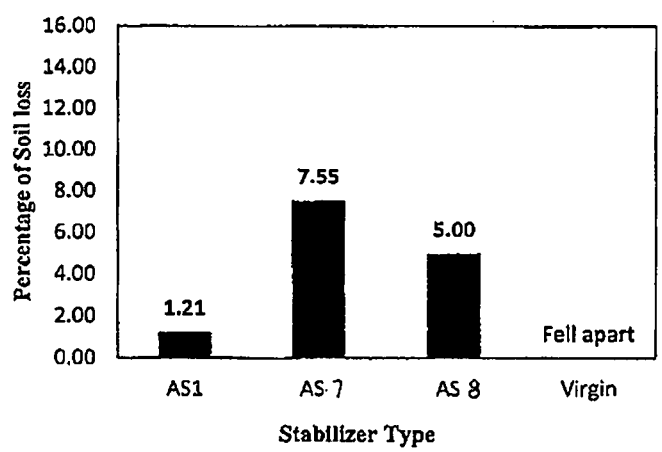
FIG. 6 is a bar graph showing the percentage of soil loss after 6 cycles (clay soil Type B).

FIGS. 5 and 6 summarize the soil loss, in percentage, at the end of 12 cycles and 6 cycles. Virgin soil for Women's Hospital showed the highest soil loss, 13.8% of the original soil, after all cycles were completed. This value was 5.9%, 10.4%, and 10.6% respectively for AS1, AS7, and AS8. Thus, soil loss was improved by 57.3%, 24.6%, and 22.6% compared to virgin soil for AS1, AS7, and AS8, respectively. Since the virgin Bishop Grandin soil sample fell apart in the third cycle, FIG. 6 displays the soil loss for stabilized soil samples only. As can be seen, AS1 (1.21) showed lowest percentage of soil loss at the end of sixth cycle, followed by AS8 (5.0) and AS7 (7.55).

The unconfined compression test was conducted on all of the Women's Hospital samples after freeze-thaw conditioning. All of the samples were kept in an environmental chamber set at −23° C. (−10° F.) overnight and then left for 1 hour at ambient temperature before conducting the unconfined compression test. Results indicated that the strength of all stabilized specimens improved significantly.

Figure 7:
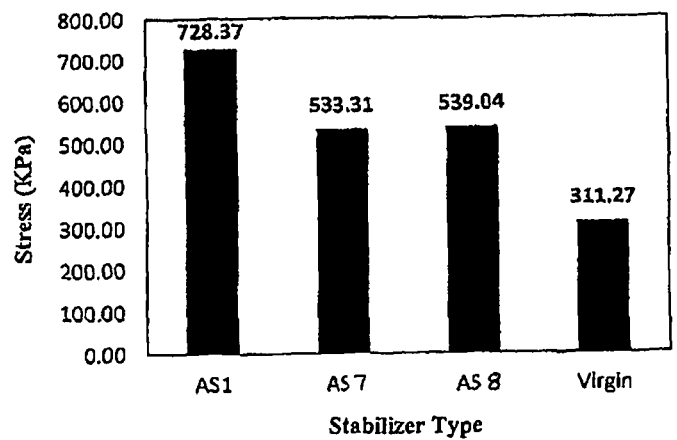
FIG. 7 is a bar graph showing the unconfined compressive strength, after 12 cycles of freezing and thawing.

FIG. 7 summarizes unconfined compression peak for samples. This figure shows that the use of AS1 (728.37), AS7 (533.31), and AS8 (539.04) enhances subgrade strength by 134%, 71.3%, and 73.2%, respectively after 12 cycles of freeze-thaw conditioning compared to virgin soil (311.27).

As discussed above, AS1 provides greater increases in strength and toughness. However, AS7 and AS8 provide acceptable increases in both strength and toughness, particularly in the stronger soil (Women's Hospital soil samples). These binders have the added benefit of using other cementitious materials, as discussed above.

Figure 8:
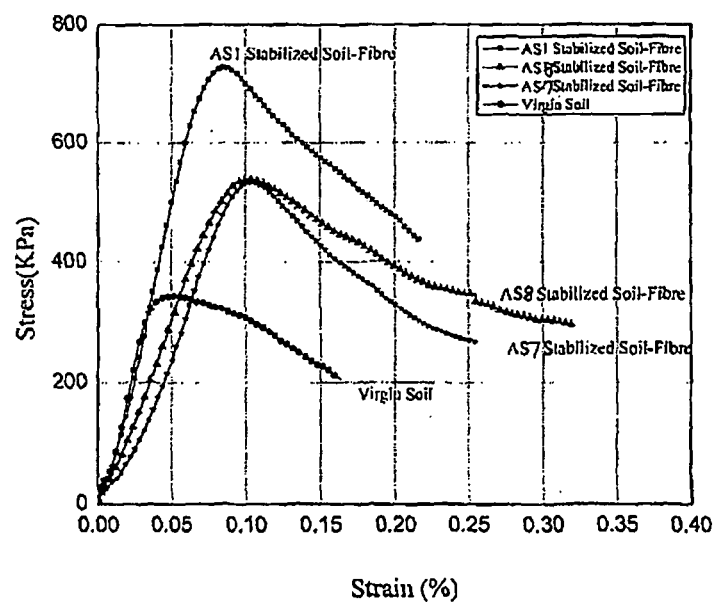
FIG. 8 is a graph of the stress-strain relationship in unconfined compressive strength after freeze-thaw conditioning.

FIG. 8 shows a considerable increase in toughness of the stabilized specimens in comparison with virgin soil. This improvement shows that fibers and stabilizers increase the resistance of subgrade to frost heave after freeze-thaw cycling.

Stabilizers showed substantial improvement in unconfined compression strength in both soil types. The toughness significantly increased when stabilizers were used. AS1 noticeably increased the strength of soil up to 72% and 527% compared to Women's Hospital and Bishop Grandin virgin soil, respectively. Stabilized soils provide higher stability and higher cracking resistance.

Stabilized soils showed a significant decrease in maximum volume change compared to virgin soil. When AS1 was used, the maximum volume change decreased by up to 72% and 52% in comparison with virgin Women's Hospital and Bishop Grandin soil, respectively.

Stabilized Women's Hospital soils showed up to a 50% decrease in soil mass loss at the end of 12 cycle freeze-thaw conditioning in comparison with virgin soil. Due to high moisture content (40%), virgin soil from Bishop Grandin collapsed after 3 conditioning cycles.

Unconfined compression results indicated that the strength of all stabilized specimens improved significantly. When AS1 was used as the stabilizer in Women's Hospital soil, strength was enhanced by 134% after 12 freezing-thaw cycles. Strength improvement extends pavement service life.

Stabilized soil samples for both locations showed an increase in toughness compared to virgin soil based on unconfined compression results.

EXAMPLE II

The unconfined compression test results (UCS) and freeze-thaw test results of treated and untreated "BC", "LG", and "DG" clay soils are presented in Tables 6-8. As can be seen, all treated samples developed significantly greater strength than the untreated soil. For example, the soil sample containing 12% AS7 at 28 days had unconfined compressive strength 3902.8 KPa compared to 121 KPa for virgin soil (see Table 6). For all treated soils, the UCS increased with increasing curing time. Treated clay soils also had higher toughness compared to untreated soils. For example, toughness increased from 8 to 85.75 for soil treated with AS7 and carpet fiber reinforcement compared to virgin soil.

For the freeze/thaw conditioning, size and weight of samples were measured at the end of each cycle. After the second cycle, cracking was observed on the sides of the virgin soil samples and the virgin soil sample fell apart during the third cycle due to high moisture content and very low stability.

The specific chemical composition of the stabilizer has significant effects on mechanical properties and performance of treated soils. For example "AS7" was a very effective stabilizer for "BC" clay soil.

Figure 9:
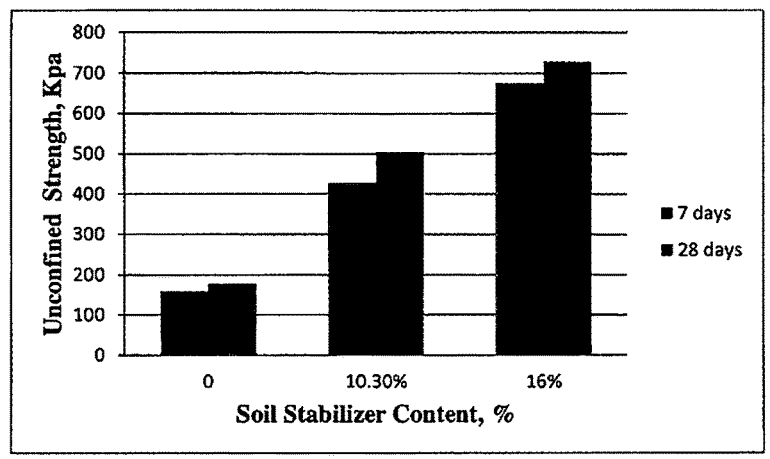
FIG. 9 shows the effect of soil stabilizer content on unconfined compressive strength. (Soils Type "LG")
Figure 10:
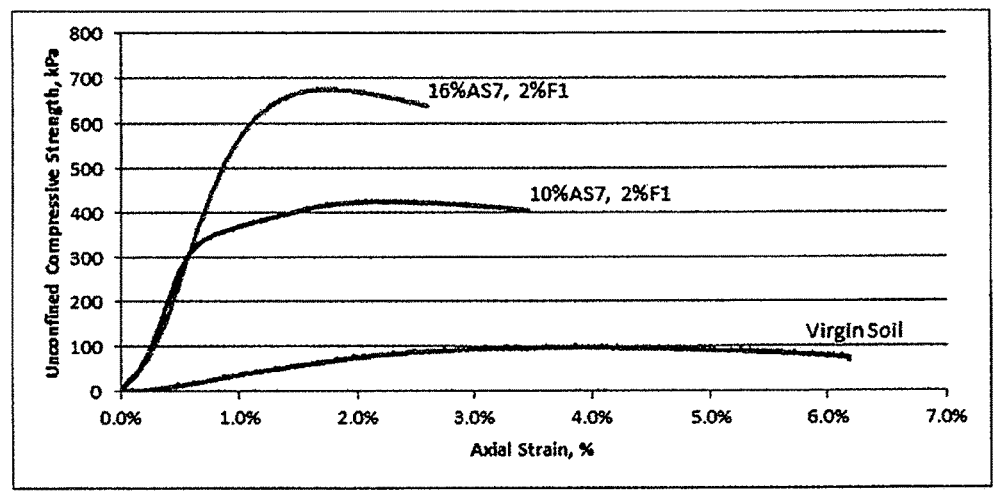
FIG. 10 shows the effect of AS7 on Compressive Strength (7 Days)
Figure 11:
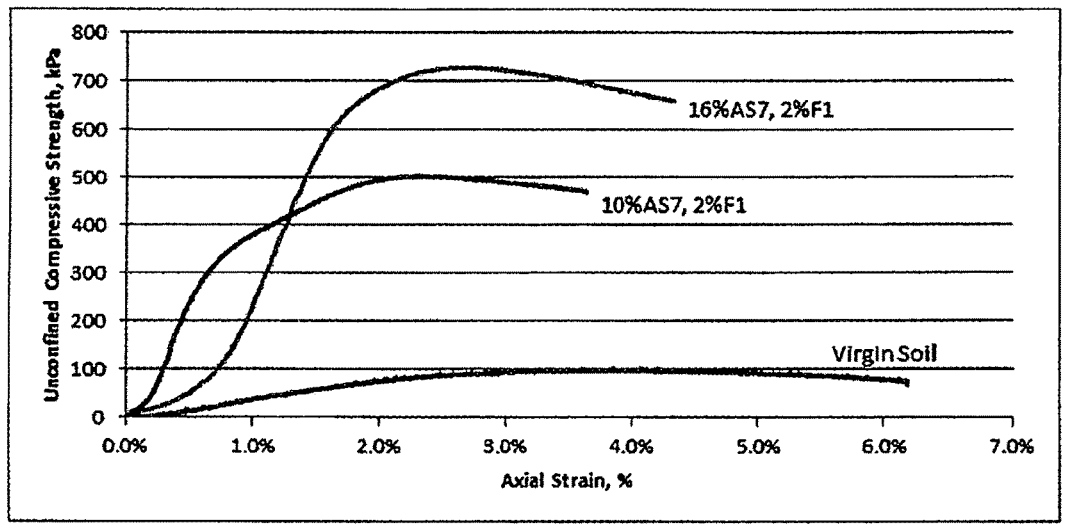
FIG. 11 shows the effect of AS7 on Compressive Strength (28 Days).

FIGS. 9-11 show the results of the UCS for "LG" soil treated with different amounts of AS7 and the same amount of carpet fibers (F1). This shows that the concentration of stabilizer and the curing time have a significant effect on strength and toughness. Increases in stabilizer content dramatically increased the strength of treated soils.

Figure 12:
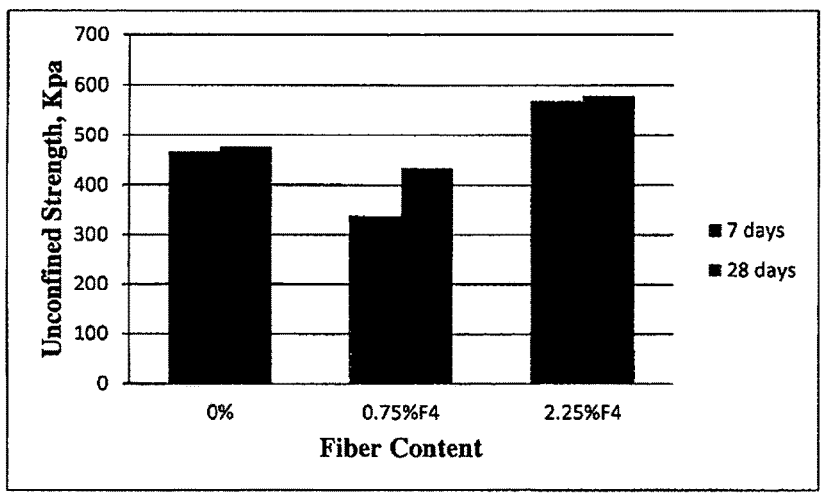
FIG. 12 shows the effect of flax mulch fibers on Compressive Strength of "LG" treated clay soils.
Figure 13:
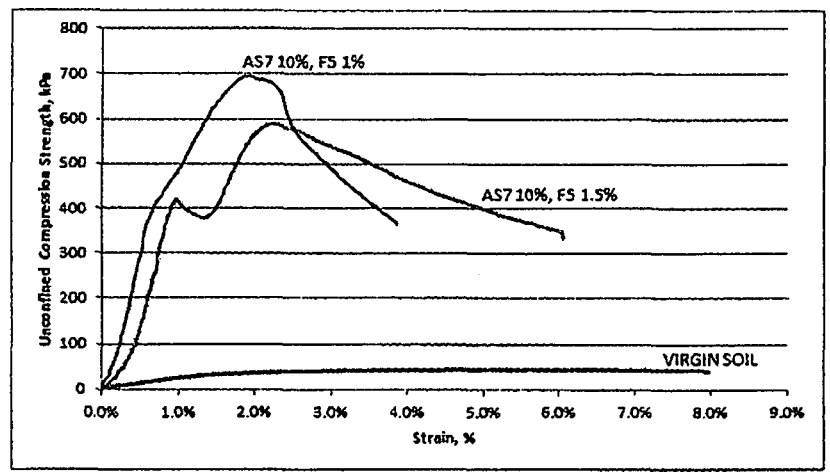
FIG. 13 shows the effect of hemp fibers on Compressive Strength of "DG" treated clay soils.

FIGS. 12 and 13 show the effect of fiber content on strength and toughness of treated soil "LG" and "DG". As can be seen from FIG. 13, soil with 0.75% flax mulch fibers has low strength compared to non-fiber treated soil, however increasing the flax mulch fiber s to 2.25% increased unconfined compressive strength. FIG. 13 shows that the addition of hemp fibers decreased the strength but increased the toughness of "DG" treated soil.

Figure 14:
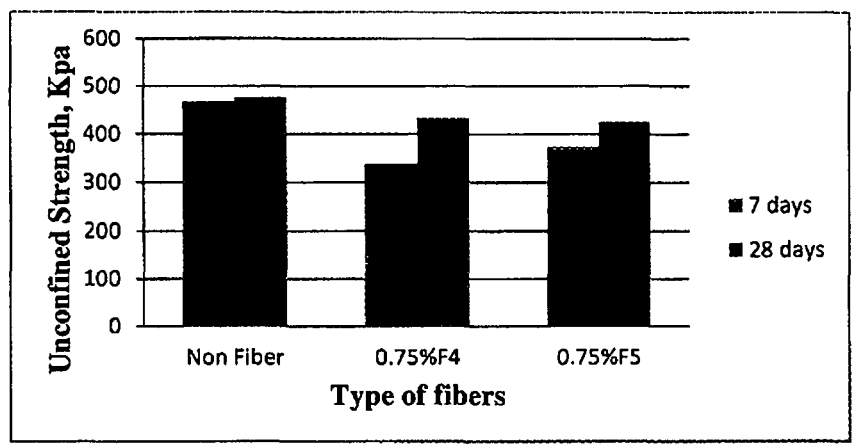
FIG. 14 shows the effect of type of fiber on unconfined compressive strength of treated and untreated "LG" clay soil with 0.75% of fiber s.
Figure 15:
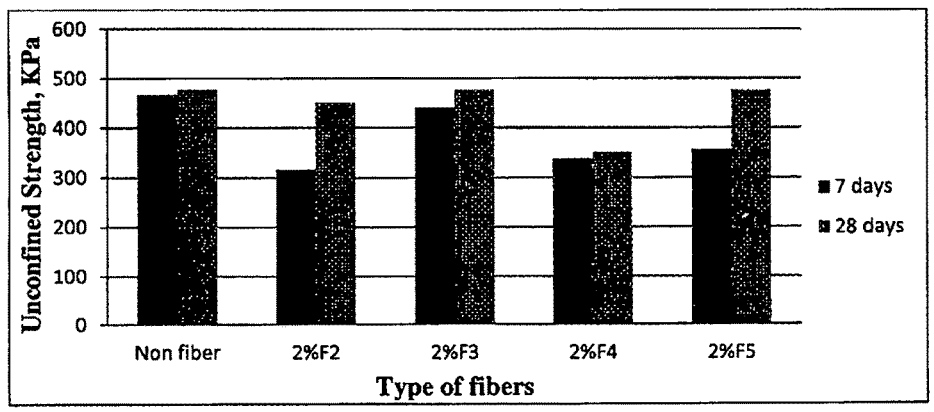
FIG. 15 shows the effect of type of fiber on unconfined compressive strength of treated and untreated "LG" clay soil with 2% of fiber s.

FIGS. 14 and 15 present 7 day and 28 day unconfined compressive strength (UCS) test results for "LG" treated clay soils with different types of fiber reinforcement and various curing times. In general, the addition of fibers decreased the UCS early (7 days), however at 28 days, the UCS of fiber reinforced treated soil (except flax mulch reinforced soil) with 2% of fibers is the same as non-reinforced treated soil.

In general, the addition of the stabilizer together with the fibers as a reinforcement element dramatically improves crack resistance while only stabilizer is not enough for crack protection. Thus, the combination of stabiliser and fiber reinforcement is a very effective method for protection of crack development.

Summary test results for treated and untreated silt clay soil at different water contents and different curing times shown in Table 9.

Silt-clay is very sensitive to moisture content changes. For example, the unconfined compressive strength of virgin "SS" is 114 KPa at 15% water content and zero at 25% water content. For example, silt clay soil (25% moisture content) with 12% stabilizer reaches 4310 KPa at 28 days. Effectiveness of the stabilizer is a function of the composition of the stabilizer, the soil and the water content. Chemical stabilizer AS20 has been very effective for low water content of silt clay soils; however, for high water content silt soil, AS25 and AS26 were very effective.

Chemical stabilization and fiber reinforcement has a significant effect on the crack potential of silt soil. Crack resistance is improved by using stabilizer and fiber reinforcement.

Subgrade Soils

Three locations were selected to provide local clay and silt clay soil. Clay subgrade soils were sampled from Bishop Grandin Street and Church Ave and Silt from Parr St. in Winnipeg. The properties of the soils are presented in Table 10.

Soil stabilizers (chemical stabiliser and/or fibers) were applied to clay and silt-clay soils.

The soil stabilizer composition (type and amount of chemical stabilizer and fiber) for Bishop Grandin Soils, Church Ave and Parr St soils used are shown in Tables 12-14.

Moisture content of "BC", "LG", "DG", "PL" soils were selected to be 40 percent to match the field conditions. Moisture content of "SS" soils was 10%, 15%, 20%, 25% and 30%. Water was added to dry soil samples and the mixture was manually mixed and left overnight in a sealed plastic bag. Fibers and chemical stabilizer were added and mixed with wet soil using a hand mixer. Mixtures were compacted. Stabilized soil was placed in steel molds in three equal layers. Each layer was compacted by 25 blows with a rammer dropping from a height of 12 inch. The compacted stabilized soil samples were kept in double plastic bags before testing. All samples were cured at room temperature (approximately 20-22° C.).

Maximum Density and Optimum water content of compacted soil was determined according to ASTM D698.

Atterberg Limits Test were performed on virgin soils according to ASTM D4318. Representative samples of each soil were subjected to Atterberg limits to determine the plasticity of the soil.

The freeze/thaw test was performed on virgin and stabilized soil according to ASTM D560.

The soil-cement losses, water content changes, and volume changes (swell and shrinkage) produced by repeated freezing and thawing of hardened soil-cement specimens were determined.

Unconfined Compression Test after Freeze and Thaw Conditioning

The unconfined compression test after freeze and thaw conditioning were performed according to TLT-504 (Alberta Department of Transportation).

Crack Potential

The restrained ring shrinkage test was performed for evaluation of crack potential of virgin and stabilized soil. For acceleration of the shrinkage process, heat treatment at 60° C. for 24 hours was used.

Resilience Modulus

Determination of resilience modulus for treated and untreated clay soils was completed according to AASHTO T307 test protocol for fine grained soil.

EXAMPLE III

The project consisted of stabilizing high plasticity clay subgrade using stabilizer AS7 and recycled carpet and flax shive blended fibers along a 100 m portion of a multiuse pathway. 12% stabilizer by dry weight was used as was a fiber concentration of 2% (1.5% of carpet fiber and 0.5% of flax shive fiber). The effects of the stabilizer and fiber reinforcement on the mechanical properties of high plasticity clay soils were studied. This effect is shown by data for DCP test results (CBR value) for treated and untreated soils (FIGS. 16 to 19). CBR value is a strength and bearing capacity indicator, as discussed herein.

Specifically, the average CBR value for virgin clay soils is ~5%. As a result of the stabilization process, an average CBR value of ~40% was attained which was close to the CBR value of limestone aggregate (gravel) which is used as a sub base and a base material for road construction. Curing time has significant effect on strength development: increased curing times increased the CBR value.

The interactions at the interface between fiber surface and soil matrix were analyzed by using scanning electron microscopy (SEM). According to EDS data, the main components of treated soil are silica, alumina and calcium.

It was found that the bond strength and friction at the interface seem to be the dominant mechanism controlling the reinforcement benefit. That is, the fiber/matrix interface is influenced by several factors, such as effective contact area and fiber surface roughness.

EXAMPLE IV

Described herein is the stabilizing of subgrade soils and full depth reclamation using an eco-friendly cementitious based stabilizer mixed with different types of fibers along a 109 m (~1400 m$^2$) portion of a parking lot, as shown in Tables 11 and 15 and FIG. 24.

The parking lot stabilization project involved the use of stabilizer and fibers along two test areas:

Area "A" (subgrade stabilization, area of 266 m²):
Removal of the existing asphalt pavement and subbase materials and the mixing of soil stabilizer and 6 different type of fibers with subgrade soils, compaction, placement of recycle sub base materials and sub base compaction.

Area "B" (full depth reclamation and stabilization, area of 1134 m²): Full depth reclamation with soil stabilizer and 5 different types of fibers and compaction.

Asphalt Concrete (thickness ~2÷2.5") was placed on the next day after the compaction process. The additional layer of asphalt (thickness ~1.5"÷2") was placed 14 days after compaction. Asphalt concrete was placed at low temperature (~3°÷5° C.).

Materials:
Subgrade Soils: High Plasticity clays "PL" (see details on Table 10)
Chemical Stabilizer Two types of stabilizer were used (see details on FIG. 24). One of them was used for subgrade stabilization and another for full depth reclamation material (sub base). Concentration of stabilizer was 12% of soil dry weight.
Fibers: Different types of bio-fibers, recycled carpet fiber, carpet and bio-fibers, and recycled FRP were used for soil reinforcement (see Table 11).
Field Density Field density testing was completed on the stabilized subgrade (Area "A") and stabilized sub base (Area "B") using a nuclear densometer. Field density testing was completed immediately following tilling with stabilizing agents and compaction and 12-24 hours following compaction of the stabilized materials.
Dual Mass Cone Penetrometer (DCP)

DCP tests were carried out on Area "A" at the 1 day, 14 days, and 28 days and on area "B" at the 14 and 28 days. The DCP test results were correlated to California Bearing Ratio (CBR).
Mechanical and Durability Properties Subgrade soil was mixed with different types of fibers and soil stabilizer on site. Treated Soil samples were collected and compacted. Unconfined compressive strength test freeze-thaw testing was performed. The unconfined compression test results (UCS) and Freeze-thaw test results of treated and fiber reinforced "PL" clay soil presented in Table 12. According to the test results, the type of fiber has a significant effect on compressive strength. Treated soil with carpet—bio-fiber mixture (F1) and FRP (F6) reinforcement showed the best results. Soil treated with reinforcement fibers F1 and F3 (flax shive) had very good stability in freeze/thaw conditions. Compressive strength of treated soil with F1 and F3 type of fibers was not affected by freeze-thaw conditioning.

The influence of the soil stabilizer and fiber reinforcement on mechanical properties of subgrade soils and sub base material were investigated. This effect is shown by data for DCP test results (CBR value) for treated subgrade soils (Area D1), Subgrade—Sub base Stabilization Area—D2-D3, Sub base Stabilization Area—D4 and D5 (FIGS. 20 to 23).

Average CBR value for virgin clay soils is ~5%. As results of stabilization process an average CBR value reached ~45%. Treated soil with F5 (hemp) type of fiber shows the best results. Stabilizer with fiber reinforcement provides a dramatic improvement in the properties of sub base materials.

While the preferred embodiments of the invention have been described above, it will be recognized and understood that various modifications may be made therein, and the appended claims are intended to cover all such modifications which may fall within the spirit and scope of the invention.

REFERENCES

[1] Seco, A., Ramirez, F., Miqueleiz, L., Garcia, B., "Stabilization of expansive soils for use in construction". Applied Clay Science, 2011, 348-352.
[2] Fonseca, A. V., Cruz, R. C., Consoli, N.C., "Strength properties of sandy soil-cement admixtures". Geotechnical and Geological Engineering, 2009, 681-686.
[3] Kolias, S., Rigopoulou, V. K., Karahalios, A., "Stabilisation of clayey soils with high calcium fly ash and cement", Cement & Concrete Composites, 2005, 301-313.
[4] Tang, C., Shi, B., Gao, W., Chen, F., Cai, Y., "Strength and mechanical behavior of short polypropylene fiber reinforced and cement stabilized clayey soil". Geotextiles and Geomembranes, 2007, 194-202.
[5] Bahar, R., Benazzoug, M., Kenai, S., "Performance of compacted cement-stabilised soil". Cement & Concrete Composites, 2004, 811-820.
[6] Kaniraj, S. R., Havanagi, V. G., "Compressive strength of cement stabilized fly ash-soil mixtures". Cement and Concrete Research, 1999, 673-677.
[7] Association of Canadian Industries recycling fly ash (CIRCA), "Production and use of coal combustion products". 2010.
[8] Freilich, B. J., Li, C., and Zomberg, J. G., "Effective Shear Strength of Fiber-Reinforced Clays". 9th International Conference on Geosynthetics, Brazil, 2010.
[9] ASTM D560.2003. Standard Test Methods for Freezing and Thawing Compacted Soil—Cement Mixtures. American society for testing and materials. West Conshohocken, Pa.
[10] ASTM D 1633.2000. Standard Test Methods for Compressive Strength of Molded Soil—Cement Cylinders. American society for testing and materials. West Conshohocken, Pa.
[11] ASTM D 558.2003. Standard Test Methods for Moisture-Density (unit Weight) Relations of Soil-Cement Mixtures. American society for testing and materials. West Conshohocken, Pa.
[12] TLT-504.2002. Freeze-Thaw Test for Soil-Cement Mixtures. Alberta Ministry of Transportation

TABLE 1

| Soil Sample | Liquid Limit | Plastic Limit | Plasticity Index | Maximum Dry Density (kg/m³) | Optimum Water Content (%) |
|---|---|---|---|---|---|
| Women's Hospital | 85.0 | 24.0 | 61.0 | 1377.0 | 29.0 |
| Bishop Grandin | 63.7 | 19.4 | 44.3 | 1423.0 | 29.6 |

TABLE 2

| Type | Cement | Calcined Clay | Glass | Blast furnace slag |
|---|---|---|---|---|
| AS1 | Yes | Yes | | |
| AS7 | Yes | Yes | Yes | Yes |
| AS8 | Yes | Yes | Yes | Yes |

TABLE 3

| Soil Specimens | Stabilizer (% by weight) | | | Carpet Fiber (% by weight) |
| --- | --- | --- | --- | --- |
| | AS1 | AS7 | AS8 | |
| Virgin | 0 | 0 | 0 | |
| AS1 Stabilized soil | 12 | 0 | 0 | |
| AS7 Stabilized soil | 0 | 25 | 0 | |
| AS8 Stabilized soil | 0 | 0 | 18 | |

TABLE 4

| Women's Hospital Specimens | | | | Bishop Grandin Specimens | | | |
| --- | --- | --- | --- | --- | --- | --- | --- |
| Virgin Soil | Stabilized soil | | | Virgin Soil | Stabilized soil | | |
| | AS1 | AS7 | AS8 | | AS1 | AS7 | AS8 |
| 19.62 | 38.43 | 37.61 | 42.12 | 9.17 | 92.43 | 21.97 | 45.87 |

TABLE 5

| Soil Specimens | Compressive Strength (KPa) | Toughness - Area (Joule) | Soil loss after 12 cycles (%) | Soil loss after 6 cycles (%) | Maximum change volume 12 cycles (%) | Maximum change volume 6 cycles (%) |
| --- | --- | --- | --- | --- | --- | --- |
| Women's hospital | | | | | | |
| Virgin soil | 273.07 | 19.62 | 13.75 | | 18.48 | |
| AS1 stabilized soil | 469.21 | 38.43 | 5.86 | | 5.03 | |
| AS7 stabilized soil | 338.94 | 37.61 | 10.36 | | 8.37 | |
| AS8 stabilized soil | 412.79 | 42.12 | 10.64 | | 8.29 | |
| Bishop Grandin | | | | | | |
| Virgin soil | 75.39 | 9.17 | | Fell apart | | 2.94 |
| AS1 stabilized soil | 472.49 | 92.43 | | 1.21 | | 5.27 |
| AS7 stabilized soil | 310.69 | 21.97 | | 7.55 | | 4.44 |
| AS8 stabilized soil | 411.56 | 45.87 | | 5.00 | | 6.07 |

TABLE 6

Test results summary for treatment and untreated "BC" clay soil a) Unconfined Test

| Type of Soil | Condition | Type of Stabilizer | Content of Stabilizer | Type of fiber | Content of fiber | Dry Density, kg/m3 | Moisture Content, % | Age, days | UCS KPa | Area under Stress-strain curve |
| --- | --- | --- | --- | --- | --- | --- | --- | --- | --- | --- |
| BC | Virgin | | | | 0 | 1190.38 | 42.5 | | 121 | 8.0 |
| BC | Treated | AS7 | 12 | F2 | 1.5 | 1297.75 | 32.0 | 7 | 2737.0 | 66.25 |
| BC | Treated | AS7 | 12 | F2 | 1.5 | 1301.56 | 41.7 | 28 | 3902.8 | 85.75 |
| BC | Treated | AS8 | 12 | F2 | 1.5 | 1310.74 | 32.7 | 7 | 2371.0 | 68.75 |
| BC | Treated | AS8 | 12 | F2 | 1.5 | 1290.54 | 34.1 | 28 | 2904.3 | 62.5 |
| BC | Treated | AS10 | 12 | F2 | 1.5 | 1302.17 | 33.9 | 7 | 2410.3 | 58.75 |
| BC | Treated | AS10 | 12 | F2 | 1.5 | 1303.38 | 33.5 | 28 | 2909.4 | 68.75 |
| BC | Treated | AS11 | 12 | F2 | 1.5 | 1306.21 | 33.9 | 7 | 1931.6 | 46.50 |
| BC | Treated | AS11 | 12 | F2 | 1.5 | 1309.50 | 33.2 | 28 | 2976.6 | 61.75 | b) Freeze-thaw test

| Type of Soil | Condition | Type of Stabilizer | Content of Stabilizer | Type of fiber | Content of fiber | Moisture Content, % | Volume Change % |
| --- | --- | --- | --- | --- | --- | --- | --- |
| BC | Virgin | 6.07 | 0 | | 0 | 39 | 6.1 |
| | Treated | AS7 | 12 | F2 | 1.5 | 30 | 2.9 |
| BC | Treated | AS8 | 12 | F2 | 1.5 | 36 | 2.8 |

TABLE 6-continued

Test results summary for treatment and untreated "BC" clay soil

| BC | Treated | AS10 | 12 | F2 | 1.5 | 40.2 | 2.25 |
|----|---------|------|----|----|-----|------|------|
| BC | Treated | AS11 | 12 | F2 | 1.5 |      | 2.03 |

TABLE 7

Test results summary for treatment and untreated "LG" clay soil a) Unconfined Test

| Stab | LG | 1 | 2 | 3 | 4 | 5 | 6 | 7 | 8 | 9 | 10 | 11 | 12 | 13 |
|------|----|----|----|----|----|----|----|----|----|----|----|----|----|----|
| AS7, % | 0 | 0 | 16 | 10 | 10 | 10 | 10 | 0 | 10 | 0 | 10 | 10 | 10 | 10 |
| Fibers | 0 | | | | | | 0 | | | | | | | |
| F1, % | | 2 | 2 | 2 | | | | | | | | | | |
| F2, % | | | | | 1.5 | | | | | | | | | |
| F3, % | | | | | | 1.5 | | | | | | | | |
| F4, % | | | | | | | | | | 1.5 | 1.5 | | 0.75 | 2.25 |
| F5, % | | | | | | | | 1.5 | 1.5 | | | 0.75 | | |

Unconfined Compressive Strength, KPa

| 7 days | 110 | 160 | 676 | 428 | 316 | 442 | 467 | 94 | 357 | 97 | 339 | 425 | 338 | 568 |
| 28 days | 110 | 178 | 729 | 504 | 451 | 477 | 477 | 108 | 476 | 134 | 351 | 374 | 434 | 579 | b) Freeze-Thaw Testing

| SOIL ID | LG | LG1 | LG2 | LG6 |
|---------|----|----|----|----|
| Type of Stabilizer | | | AS7 | AS7 |
| Content of Stabilizer | 0 | 0 | 16 | 10 |
| Type of Fibers | | F1 | F1 | |
| Content of Fiber | 0 | 2 | 2 | 0 |
| Water content, % | 47 | 48 | 36 | 40 |
| Volume Change(%) | 4.3 | 8.62 | 1.82 | 0.32 |

TABLE 8

Test results summary for treatment and untreated "DG" clay soil a) Unconfined compressive strength

| Stab | DG | 1 | 2 | 3 | 4 | 7 | 8 | 9 | 10 | 11 |
|------|----|----|----|----|----|----|----|----|----|----|
| AS7, % | 0 | 0 | 16 | 10 | 10 | 0 | 10 | 0 | 10 | 10 |
| Fibers | 0 | | | | | | | | | |
| F1, % | | 2 | 2 | 2 | | | | | | |
| F2, % | | | | | 1.5 | | | | | |
| F3, % | | | | | | | | | | |
| F4, % | | | | | | | | | 1.5 | 1.5 |
| F5, % | | | | | | 1.5 | 1.5 | | | 0.75 |

Unconfined Compressive Strength, KPa

| 7 days | 24 | 53 | 515 | 367 | 519 | 99.7 | 527 | 163 | 452 | 498 |
| 28 days | 24 | 62 | 966 | 335 | 612 | 58 | 598 | 164 | 484 | 806 | b) Freeze-Thaw Testing

| SOIL ID | DG2 |
|---------|-----|
| Type of Stabilizer | AS7 |
| Content of Stabilizer | 16 |
| Type of Fibers | F1 |
| Content of Fiber | 2 |
| Water content, % | 52.4 |
| Volume Change (%) | 2.72 |

TABLE 9

Test results summary for treatment and untreatment "SS" silty-clay soil

| Initial Water Content, % | Type of Soil | Type of Stabilizer | Compressive strength at 7 days, KPa | Compressive strength at 28 days, KPa | Compressive strength 135 days, KPa |
|---|---|---|---|---|---|
| 15 | SS | — | 114 | 114 | |
| | SS | AS1 | 3130 | | |
| | SS | AS20 | 3380 | 5320 | |
| | SS | AS21 | 1150 | 3550 | 5001 |
| | SS | AS24 | | 4320 | |
| | SS | AS25 | | 3930 | |
| | SS | AS26 | | 3850 | |
| 20 | SS | — | 45 | 45 | |
| | SS | AS1 | 1210 | | |
| | SS | AS20 | 1360 | 2480 | |
| | SS | AS21 | 1360 | 2000 | |
| | SS | AS24 | | 2980 | |
| | SS | AS25 | | 3130 | |
| | SS | AS26 | | 3680 | |
| 25 | SS | — | 0 | 0 | |
| | SS | AS1 | 2310 | | |
| | SS | AS20 | 990 | 2638 | |
| | SS | AS21 | 906 | 1920 | |
| | SS | AS24 | | 3180 | |
| | SS | AS25 | | 4310 | |
| | SS | AS26 | | 3650 | |
| 30 | SS | — | 0 | 0 | |
| | SS | AS1 | 2380 | | |
| | SS | AS20 | 1900 | 2950 | |
| | SS | AS21 | 1040 | 1610 | |
| | SS | AS24 | | 2510 | |
| | SS | AS25 | | 2333 | |
| | SS | AS26 | | 2240 | |

TABLE 10

Properties of Virgin Soil

| Location | Soil Sample | Liquid Limit | Plastic Index | Soil Class. | Maximum dry density, kg/m3 | Optimum Water Content, % | Mineralogical Composition |
|---|---|---|---|---|---|---|---|
| Bishop Grandin | BC | 63.7 | 44.3 | CH | 1423 | 29.6 | Nontronite Montmorillonite Vermiculite Kaolinite Quartz |
| Bishop Grandin | LG | 81.5 | 58.9 | CH | | | |
| Bishop Grandin | DG | 90.5 | 65 | CH | | | |
| Church Ave | PL | 51 | 33 | CH | | | |
| Parr St | SS | 28 | 10 | CL | | | |

TABLE 11

Soil reinforcement materials

| Fiber | Type of fiber | Fiber size, mm | Manufacturer |
|---|---|---|---|
| F1 | Carpet + bio-fiber | 5-30 | Antex |
| F2 | Carpet | 5-30 | Aspera |
| F3 | Flax shive | 20-30 | SWM |
| F4 | Flax mulch | 1-20 | SWP |
| F5 | Cleaned hemp | 1-15 | Wally Empson |
| F6 | FRP | 10-40 | Eco-Wolf |

TABLE 12

Soil Stabilizer composition for clay soils type "BC", "LG", "DG"

a) BC Clay Soils

| BC | 1 | 2 | 3 | 4 | 5 | 6 |
|---|---|---|---|---|---|---|
| Type of Stab | | AS1 | AS4 | AS7 | AS8 | AS10 | AS11 |
| Content of Stab | 0 | 12 | 25 | 20 | 12 | 12 | 12 |
| Fibers | | F2 | F2 | F2 | F2 | F2 | F2 |
| Fibers content, % | 0 | 1.5 | 1.5 | 1.5 | 1.5 | 1.5 | 1.5 | b) Light Grey Clay Soil "LG"

| Stab | LG | 1 | 2 | 3 | 4 | 5 | 6 | 7 | 8 | 9 | 10 | 11 | 12 | 13 |
|---|---|---|---|---|---|---|---|---|---|---|---|---|---|---|
| AS7, % | 0 | 0 | 16 | 10 | 10 | 10 | 10 | 0 | 10 | 0 | 10 | 10 | 10 | 10 |
| Fibers | 0 | | | | 0 | | | | | | | | | |

TABLE 12-continued

Soil Stabilizer composition for clay soils type "BC", "LG", "DG"

| F1, % | 2 | 2 | 2 | | | | | | | | |
|---|---|---|---|---|---|---|---|---|---|---|---|
| F2, % | | | | 1.5 | | | | | | | |
| F3, % | | | | | 1.5 | | | | | | |
| F4, % | | | | | | | 1.5 | 1.5 | | 0.75 | 2.25 |
| F5, % | | | | | | 1.5 | 1.5 | | 0.75 | | | c) Dark Grey Clay Soil

| Stab | DG | 1 | 2 | 3 | 4 | 5 | 6 | 7 | 8 | 9 | 10 | 11 |
|---|---|---|---|---|---|---|---|---|---|---|---|---|
| AS7, % | 0 | 0 | 16 | 10 | 10 | 10 | 10 | 0 | 10 | 0 | 10 | 10 |
| Fibers | 0 | | | | | | 0 | | | | | |
| F1, % | | 2 | 2 | 2 | | | | | | | | |
| F2, % | | | | | 1.5 | | | | | | | |
| F3, % | | | | | | 1.5 | | | | | | |
| F4, % | | | | | | | | | 1.5 | 1.5 | | |
| F5, % | | | | | | | | 1.5 | 1.5 | | | 0.75 |

TABLE 13

Soil Stabilizer composition for clay soils type "PL"

| | PL1 | PL2 | PL3 | PL4 | PL5 | PL6 | PL7 |
|---|---|---|---|---|---|---|---|
| Type of Stabiliser | AS7 | AS7 | AS7 | AS7 | AS7 | AS7 | AS7 |
| Content of Stabilizer, % | 12 | 12 | 12 | 12 | 12 | 12 | 12 |
| Fibers | | F1 | F2 | F3 | F4 | F5 | F6 |
| Fibers content, % | | | | | | | |

TABLE 14

Soil Stabilizer composition for silt clay soils type "SS"

| | SS1 | SS2 | SS3 | SS4 | SS5 | SS6 | SS7 | SS8 | SS9 | SS10 |
|---|---|---|---|---|---|---|---|---|---|---|
| Type of Stabiliser | AS1 | AS20 | AS21 | AS22 | AS23 | AS24 | AS25 | AS26 | AS20 | AS25 |
| Content of Stabilizer | 12 | 12 | 12 | 12 | 12 | 12 | 12 | 12 | 12 | 12 |
| Fibers | | | | | | | | | F1 | F1 |
| Fibers content, % | | | | | | | | | 1.5, 2.0 | 1.5, 2.0 |

TABLE 15

Test results summary for treated subgrade clay soil (Parking Lot testing Area)

a) Unconfined Compressive Strength Test

| SOIL ID | F1 | F2 | F3 | F4 | F6 |
|---|---|---|---|---|---|
| Type of Stabilizer | AS7 | AS7 | AS7 | AS7 | AS7 |
| Content of Stabilizer | 12 | 12 | 12 | 12 | 12 |
| Type of Fibers | F1 | F2 | F3 | F4 | F6 |
| Fiber content, % | 2 | 1.5 | 1.5 | 2.25 | 1.5 |
| 1 day | | | | | |
| Compressive strength, KPa | 1239.2 | | 1160.4 | | |
| Water content, % | 16.5% | 13.5% | 18.6% | 34.4% | 27.3% |
| Dry Density, (kg/cm^3) | 1564.68 | | 1594.98 | | |
| 4 days | | | | | |
| Compressive strength, KPa | | | | 871.5 | 1078.1 |
| Water content, % | | | | 33.4% | 24.6% |
| Dry Density, (kg/cm^3) | | | | 1287.59 | 1483.94 |
| 7 days | | | | | |
| Compressive strength, KPa | 2259.1 | 1819.7 | 1737.6 | 1757.02 | 1703.18 |
| Water content, % | 15.8% | 20.5% | 18.8% | 27.2% | 25.3% |
| Dry Density, (kg/cm^3) | 1555.62 | 1442.15 | 1555.06 | 1441.16 | 1494.11 |

TABLE 15-continued

Test results summary for treated subgrade clay soil (Parking Lot testing Area)

28 days

| | | | | | |
|---|---|---|---|---|---|
| Compressive strength, KPa | 2354.2 | 1456.4 | 1936.1 | 1585 | 3002.8 |
| Water content, % | 16.4% | 19.9% | 18.4% | 33.2% | 24.6% | b) Freeze-Thaw Testing

| SOIL ID | F1 | F3 |
|---|---|---|
| Type of Stabilizer | AS7 | AS7 |
| Content of Stabilizer | 12 | 12 |
| Type of Fibers | F1 | F3 |
| Volume Change(%) | 0.667 | 0.611 |
| Compressive Strength after 12 Freeze-Thaw Cycles, KPa | 2250.2 | 2102.2 |

NOTE:
F4-added 20% water to soil/
F6-added 15% water to soil
F4 & F6 cylinders compacted 4 days after initial mixing of stabilizer and fibers

The invention claimed is:

1. A method of stabilizing a quantity of soil comprising:
   mixing a quantity of soil with 0.5-3.0% (w/w) fibers to a substantially homogeneous mixture, said fibers being selected from the group consisting of: recycled carpet fibers; fiber reinforced polymer; biofibers and mixtures thereof;
   adding to said mixture 5-40% (w/w) of a binder, said binder comprising a mixture of Portland cement, and one or more of ground blast furnace slag, crushed glass and metakaolin, said mixture comprising 50-85% (w/w) Portland Cement; 0-50% (w/w) crushed glass; 0-15% (w/w) metakaolin; and 0-50% (w/w) ground blast furnace slag; and
   compacting the mixture.

2. The method according to claim 1 wherein the biofiber is selected from the group consisting of hemp, flax, straw, flax shive and flax mulch.

3. The method according to claim 1 wherein the fibers are of a length between 1-40 mm.

4. The method according to claim 1 wherein the fibers are added at 0.75% to 2.5% of the dry weight of the soil.

5. The method according to claim 1 wherein the binder is added at 10-40% of the dry soil weight.

6. A method of stabilizing a quantity of soil comprising:
   removing a quantity of soil from a soil area to be stabilized;
   mixing the soil with 0.5-3.0% (w/w) fibers to a substantially homogeneous mixture, said fibers being selected from the group consisting of: recycled carpet fibers; fiber reinforced polymer; biofibers and mixtures thereof;
   adding to said mixture 5-40% (w/w) of a binder, said binder comprising a mixture of Portland cement, and one or more of ground blast furnace slag, crushed glass and metakaolin, said mixture comprising 50-85% (w/w) Portland Cement; 0-50% (w/w) crushed glass; 0-15% (w/w) metakaolin; and 0-50% (w/w) ground blast furnace slag;
   applying said mixture to the soil area to be stabilized; and
   compacting the mixture and the soil area to be stabilized.

7. The method according to claim 6 wherein the biofiber is selected from the group consisting of hemp, flax, straw, flax shive and flax mulch.

8. The method according to claim 6 wherein the fibers are of a length between 1-40 mm.

9. The method according to claim 6 wherein the fibers are added at 0.75% to 2.5% of the dry weight of the soil.

10. The method according to claim 6 wherein the binder is added at 10-40% of the dry soil weight.

11. A method of carrying out a full depth reclamation procedure comprising:
    pulverizing a quantity of asphalt, concrete or cement;
    mixing the pulverized asphalt, concrete or cement with 0.5-3.0% (w/w) fibers to a substantially homogeneous mixture, said fibers being selected from the group consisting of: recycled carpet fibers; fiber reinforced polymer; biofibers and mixtures thereof;
    adding to said mixture 5-40% (w/w) of a binder, said binder comprising a mixture of Portland cement, and one or more of ground blast furnace slag, crushed glass and metakaolin, said mixture comprising 50-85% (w/w) Portland Cement; 0-50% (w/w) crushed glass; 0-15% (w/w) metakaolin; and 0-50% (w/w) ground blast furnace slag; and
    compacting the mixture.

12. The method according to claim 11 wherein the biofiber is selected from the group consisting of hemp, flax, straw, flax skive and flax mulch.

13. The method according to claim 11 wherein the fibers are of a length between 1-40 mm.

14. The method according to claim 11 wherein the fibers are added at 0.75% to 2.5% of the dry weight of the soil.

15. The method according to claim 11 wherein the binder is added at 10-40% of the dry soil weight.

* * * * *